(12) United States Patent
Flood et al.

(10) Patent No.: US 12,312,931 B1
(45) Date of Patent: May 27, 2025

(54) TRAILER-INTEGRATED SELF-CONTAINED FRAC-SAND SYSTEM AND METHOD WITH SAFETY FEATURES

(71) Applicant: Site Prop Systems, Inc., Colorado City, TX (US)

(72) Inventors: Jeffrey D. Flood, Mayer, MN (US); Joseph G. Kreuser, Prior Lake, MN (US)

(73) Assignee: Site Prop Systems, Inc., Colorado City, TX (US)

( * ) Notice: Subject to any disclaimer, the term of this patent is extended or adjusted under 35 U.S.C. 154(b) by 0 days.

(21) Appl. No.: 19/051,090

(22) Filed: Feb. 11, 2025

Related U.S. Application Data

(60) Provisional application No. 63/738,740, filed on Dec. 24, 2024.

(51) Int. Cl.
*E21B 43/26* (2006.01)
*B65G 41/00* (2006.01)

(52) U.S. Cl.
CPC ........ *E21B 43/2607* (2020.05); *B65G 41/002* (2013.01); *B65G 41/008* (2013.01)

(58) Field of Classification Search
CPC . E21B 43/2607; E21B 43/267; B65G 41/002; B65G 41/008
See application file for complete search history.

(56) References Cited

U.S. PATENT DOCUMENTS

| | | | |
|---|---|---|---|
| 2,775,438 A | 12/1956 | Bach et al. | |
| 3,552,546 A | 1/1971 | Rath | |
| 4,135,614 A | 1/1979 | Penterman et al. | |
| 4,249,351 A | 2/1981 | Brock | |
| 4,355,687 A | 10/1982 | Theurer et al. | |
| 4,655,402 A | 4/1987 | Desourdy | |
| 5,049,261 A | 9/1991 | Tapp et al. | |
| 5,090,483 A | 2/1992 | Theurer et al. | |

(Continued)

OTHER PUBLICATIONS

P&Q Staff, "KPI-JCI: 1892S", "Accessed at web page: https://www.pitandquarry.com/kpi-jci-1892s/", Jun. 2013, Publisher: Pit &Quarry.

(Continued)

*Primary Examiner* — Brad Harcourt
(74) *Attorney, Agent, or Firm* — Charles A. Lemaire; Lemaire Patent Law Firm, P.L.L.C.

(57) ABSTRACT

A self-contained single-trailer sand-conveyor and mixer system capable of being erected into an operational configuration and reconfigured into a compact highway-travel configuration, without the need for safety harnesses. The system, mounted on a single trailer, includes an input feed hopper for side-loading sand, first and second conveyors for material transport, a sand-liquid blender for producing frac-sand slurry, a vibratory sifter for debris removal, and a discharge funnel with a boot for precise slurry output. The system also integrates automated elevation actuators, and height-maintenance locks. Some embodiments include hydraulic mechanisms to ensure operational stability and worker safety. With pre-assembled components, OSHA-compliant safety features, and a generator-powered control system, this invention offers quick deployment, improved safety, and efficient frac-sand handling.

22 Claims, 20 Drawing Sheets

(56) References Cited

U.S. PATENT DOCUMENTS

| | | |
|---|---|---|
| 5,297,914 A | 3/1994 | Ash |
| 5,515,961 A | 5/1996 | Murphy et al. |
| 5,833,043 A | 11/1998 | Schmidgall et al. |
| 6,929,113 B1 | 8/2005 | Hoover et al. |
| 7,424,943 B2 | 9/2008 | Gausman et al. |
| 7,461,746 B1 | 12/2008 | Egge et al. |
| 8,302,890 B2 | 11/2012 | Lewis-Gray |
| 9,409,184 B1 | 8/2016 | Mickelson et al. |
| 9,663,303 B2 | 5/2017 | Waldner et al. |
| 9,896,918 B2 | 2/2018 | Munisteri |
| 9,975,712 B2 | 5/2018 | Friesen |
| 10,053,308 B2 | 8/2018 | Toews et al. |
| 10,378,326 B2 | 8/2019 | Morris et al. |
| 10,633,174 B2 | 4/2020 | Pham et al. |
| 10,654,046 B2 | 5/2020 | Moran et al. |
| 10,710,811 B2 | 7/2020 | Igoe |
| 10,982,505 B2 | 4/2021 | Oehler et al. |
| 10,989,018 B2 | 4/2021 | Oehler et al. |
| 11,185,869 B2 | 11/2021 | Ivanoff |
| 11,364,507 B2 | 6/2022 | Convery |
| 11,376,631 B2 | 7/2022 | Kykyri et al. |
| 11,408,247 B2 | 8/2022 | Oehler et al. |
| 11,465,155 B1 | 10/2022 | Mitchell et al. |
| 11,885,206 B2 | 1/2024 | Christinzio et al. |
| 11,896,983 B2 | 2/2024 | Mitchell et al. |
| 11,975,930 B2 | 5/2024 | Koehl |
| 12,060,235 B2 | 8/2024 | Herman et al. |
| 12,115,535 B1 | 10/2024 | Mitchell et al. |
| 2020/0108364 A1* | 4/2020 | Glass .................. B01F 35/3204 |
| 2022/0410172 A1 | 12/2022 | Mitchell et al. |
| 2023/0271192 A1 | 8/2023 | Bibancos et al. |
| 2024/0271515 A1* | 8/2024 | Bolt .................... E21B 43/2607 |

OTHER PUBLICATIONS

Superior Industries, Inc., "Conveying Equipment Product Handbook", "Internet: https://superior.widen.net/s/nxhwjkllnc/conveying-equipment-product-handbook-low-resolution?utm_referrer=https%3A%2F%2Fsuperior-ind.com%2F", 2024, pp. 1-50 (of 88).

* cited by examiner

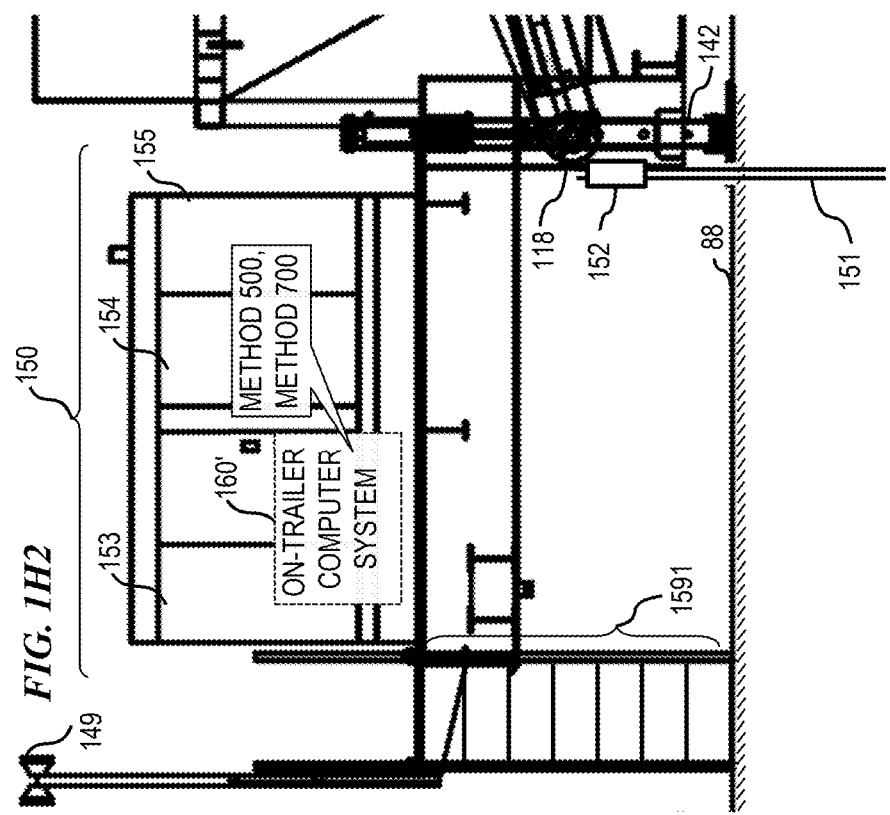
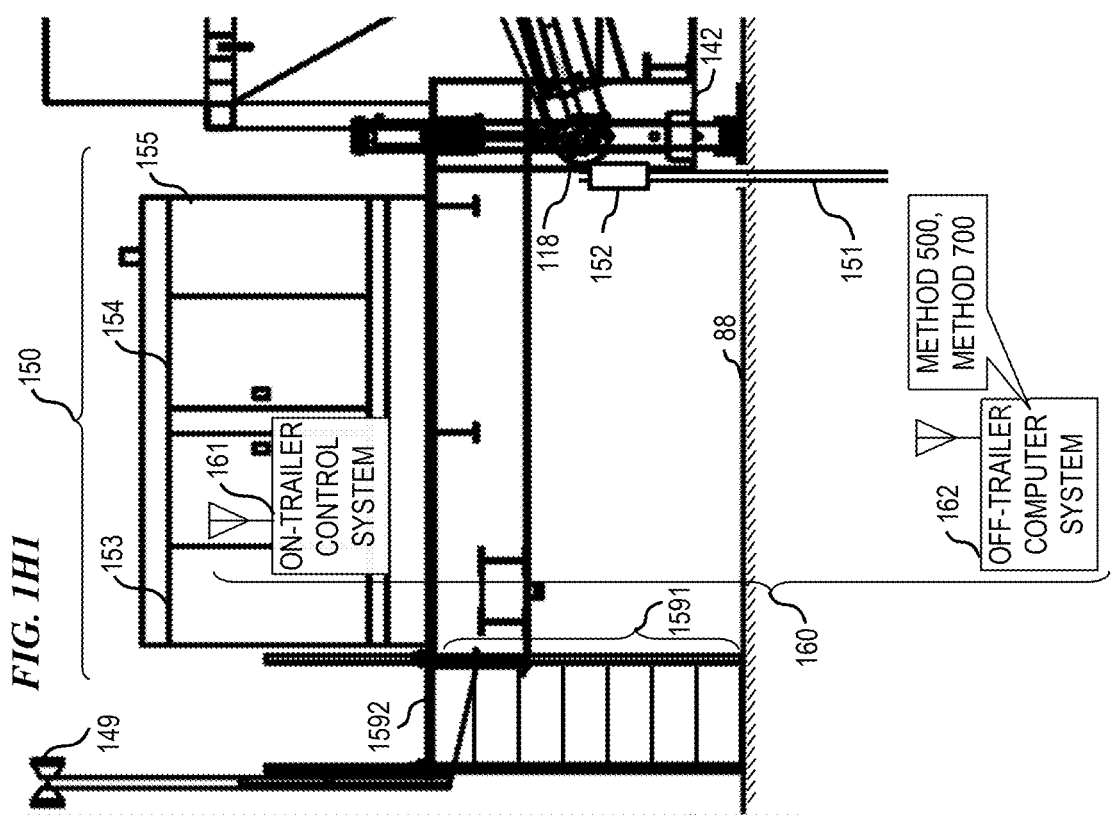

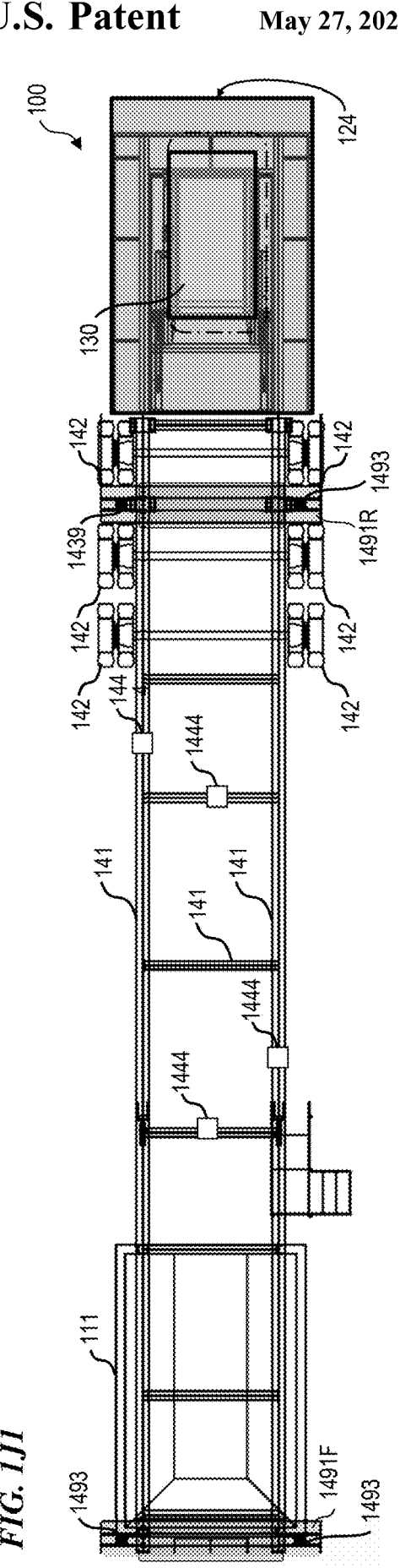
FIG. 1J1
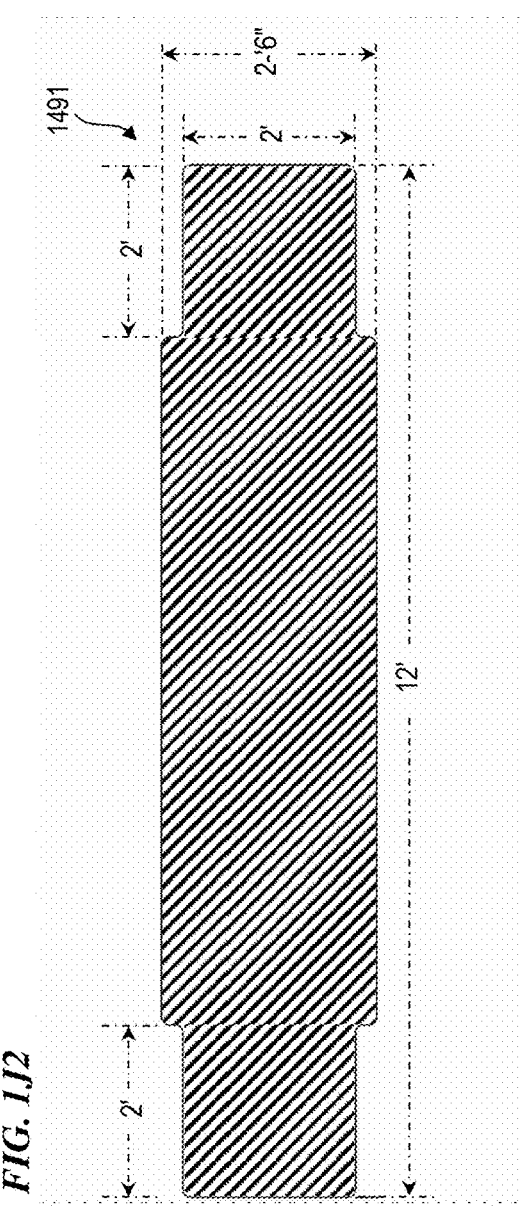
FIG. 1J2

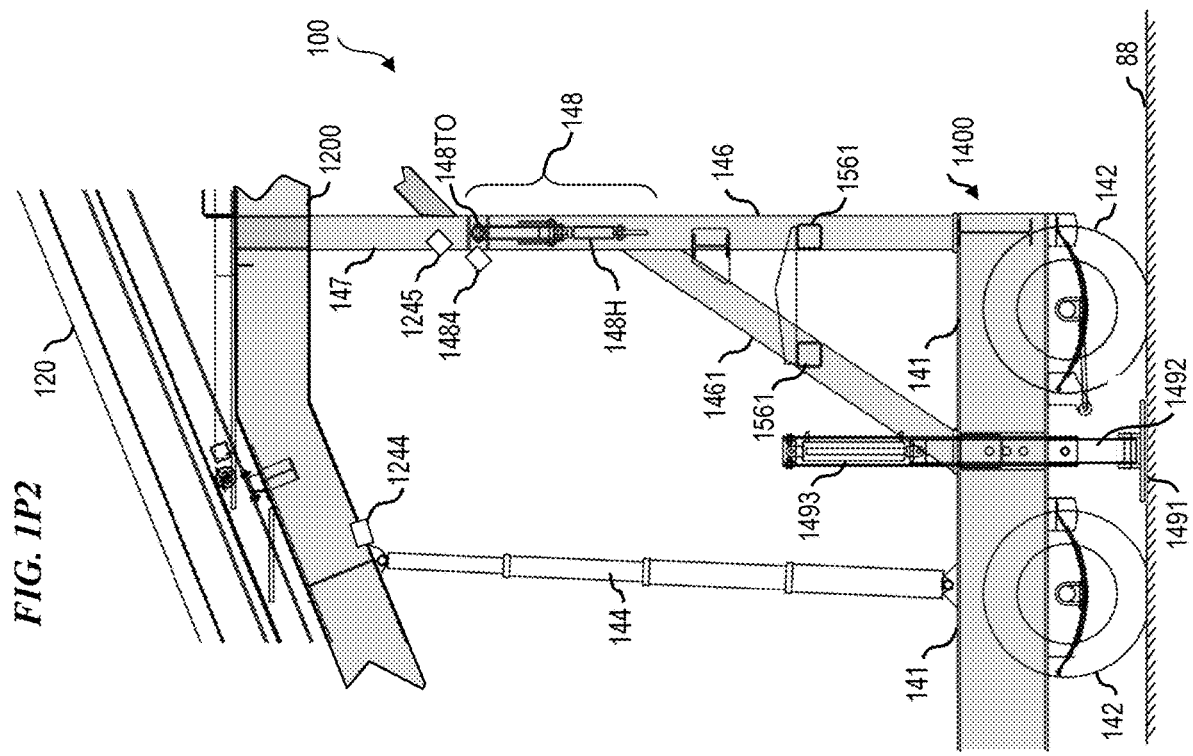
FIG. 1P1
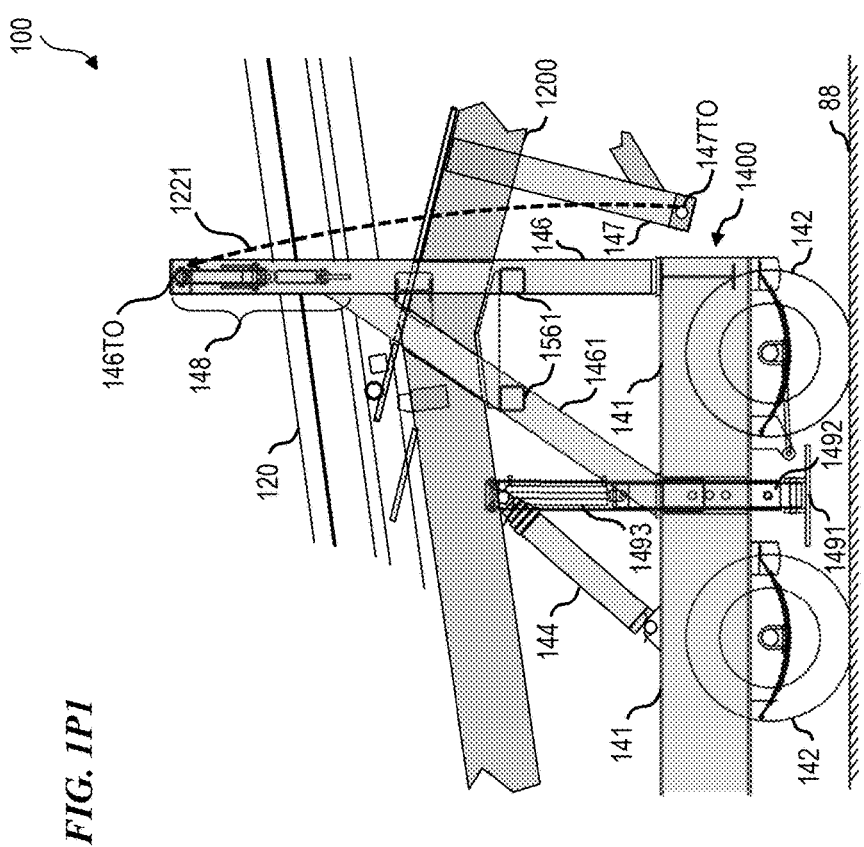
FIG. 1P2

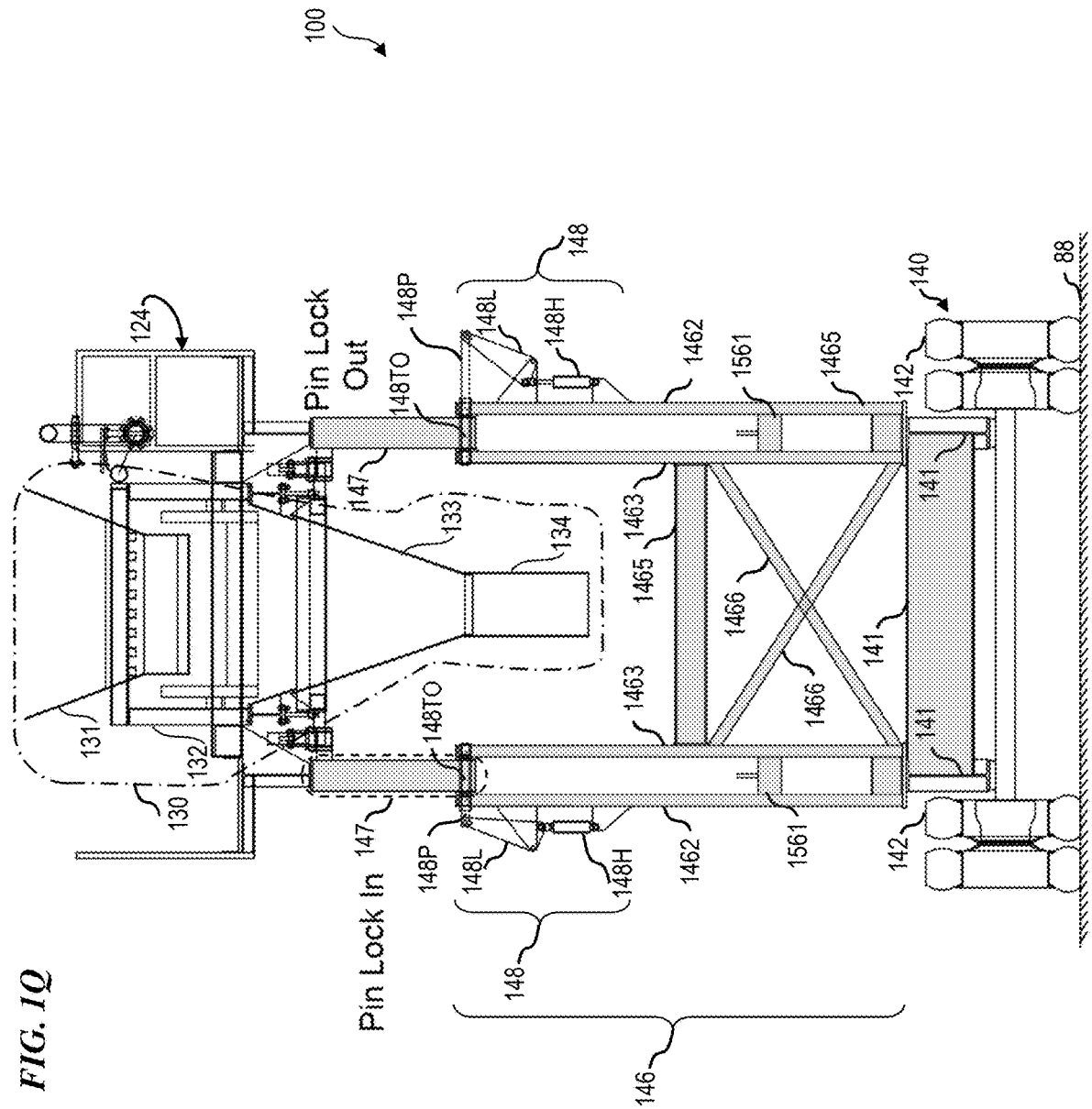

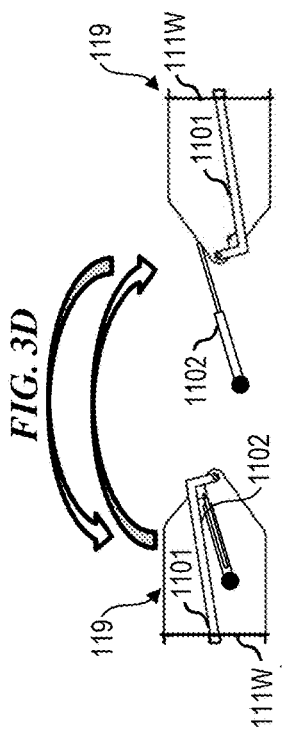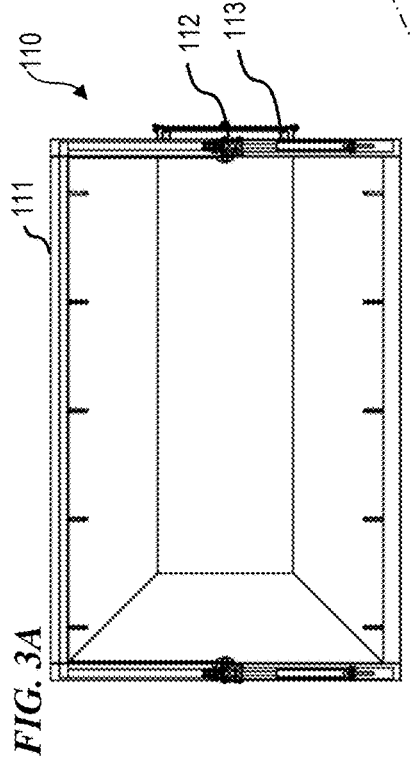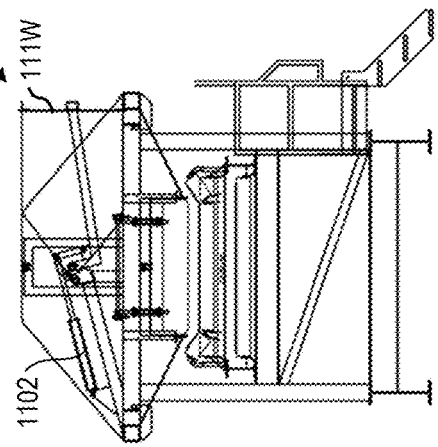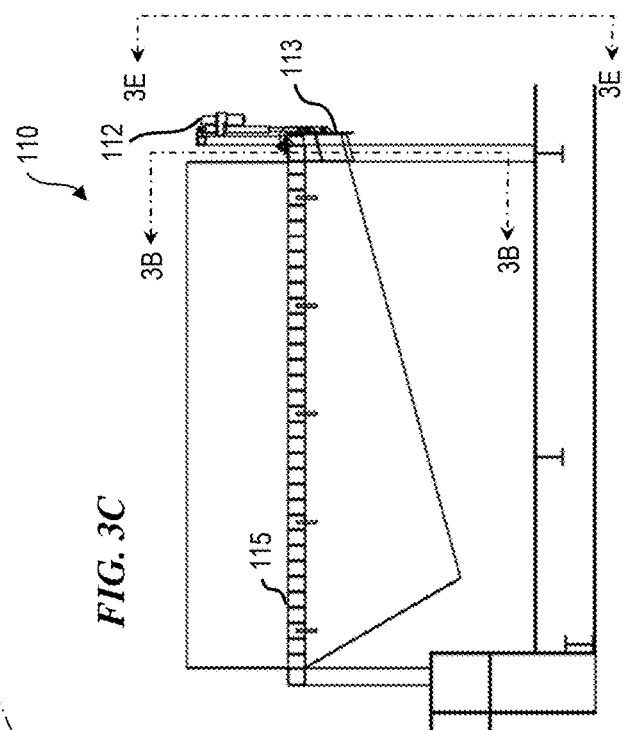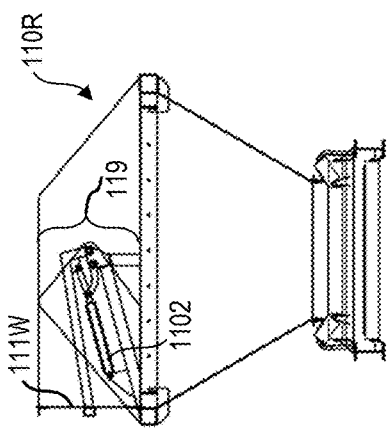
FIG. 3A
FIG. 3B
FIG. 3C
FIG. 3D
FIG. 3E

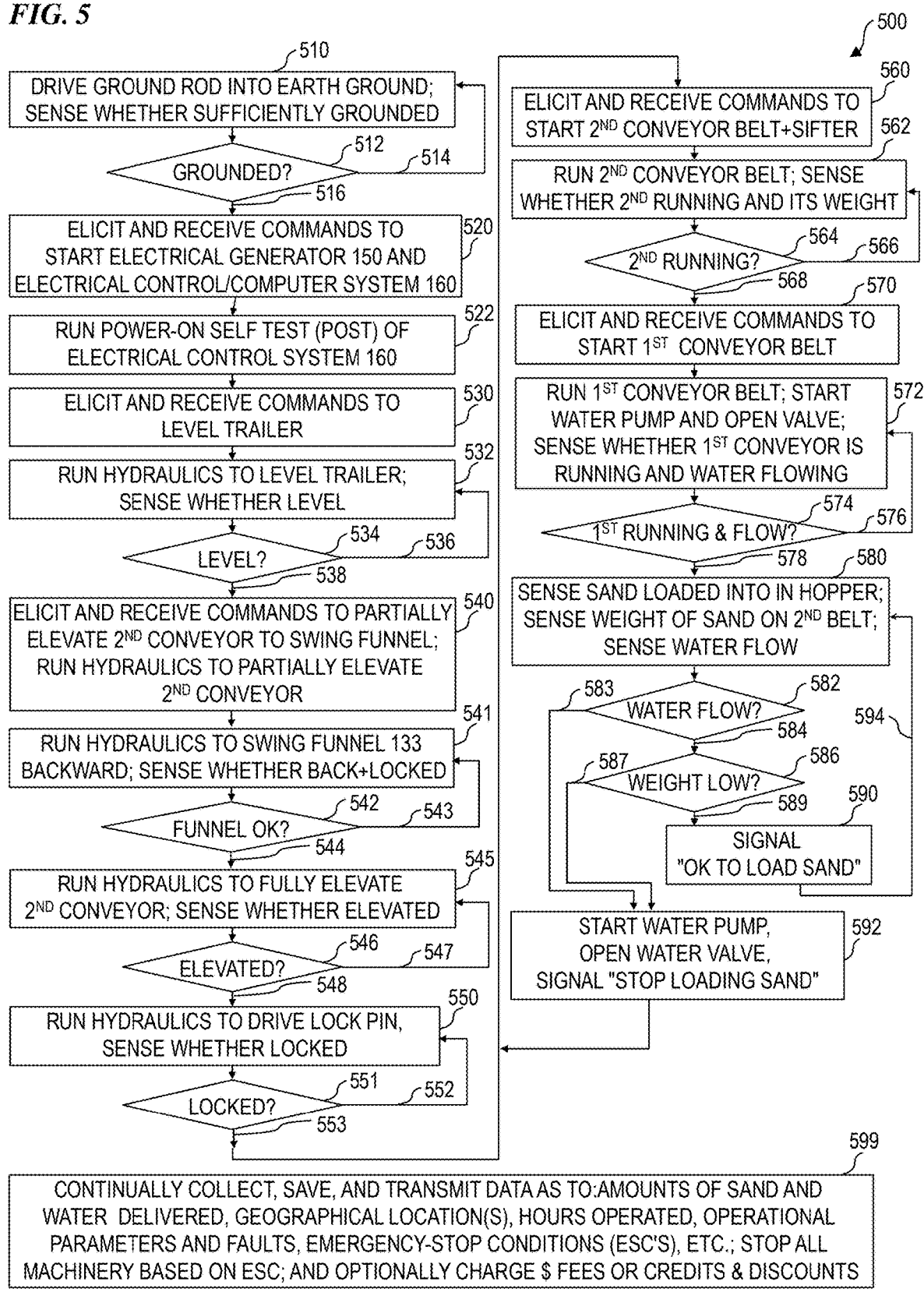

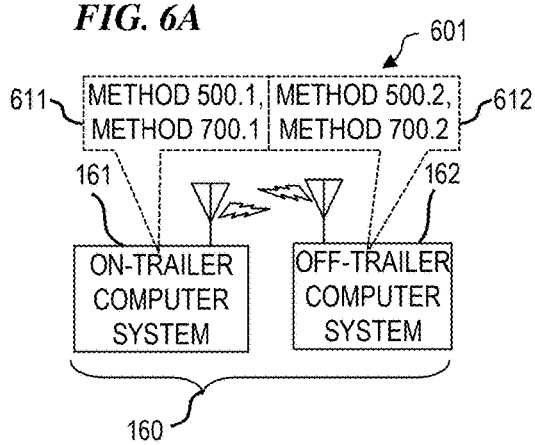
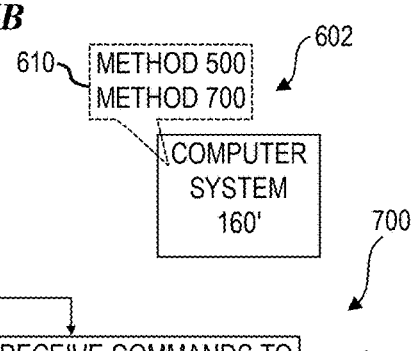
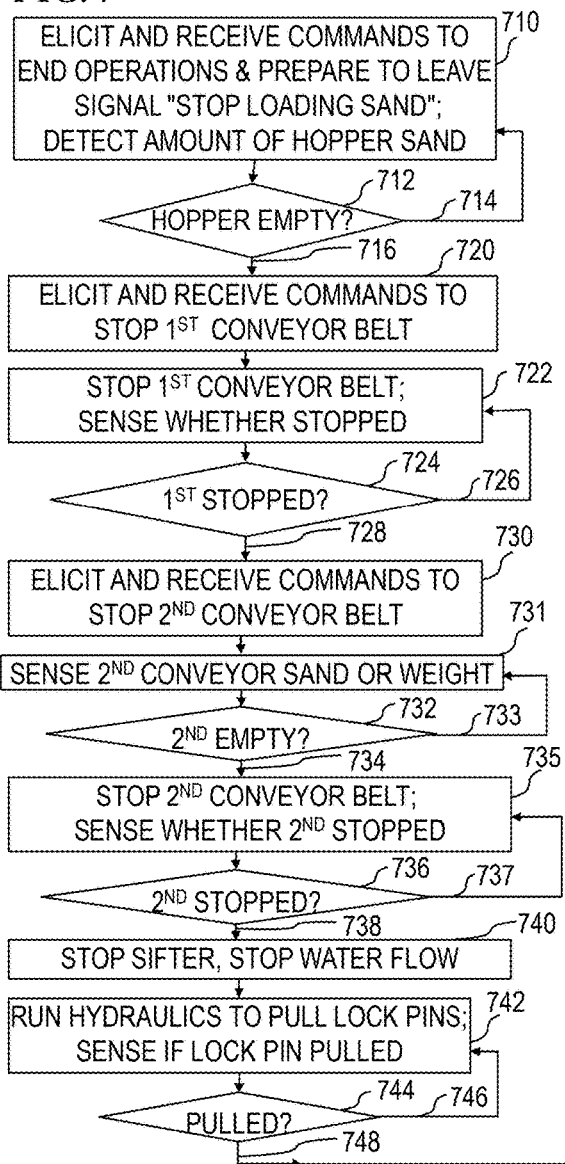
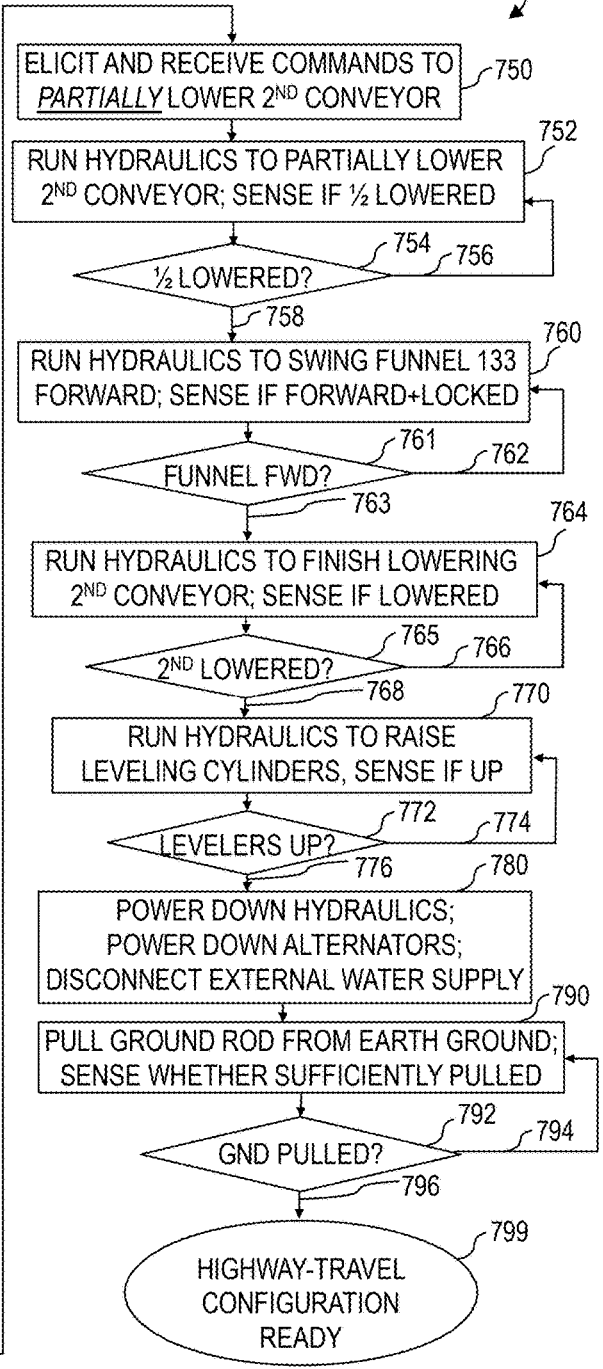

TRAILER-INTEGRATED SELF-CONTAINED FRAC-SAND SYSTEM AND METHOD WITH SAFETY FEATURES

CROSS-REFERENCE TO RELATED APPLICATIONS

This application claims priority benefit, including under 35 U.S.C. § 119 (e), of U.S. Provisional Patent Application No. 63/738,740 filed Dec. 24, 2024 by Jeffrey D. Flood et al., titled "Trailer-mounted self-contained frac sand system and method with safety features," which is incorporated herein by reference in its entirety.

FIELD OF THE INVENTIONS

This invention relates to the field of oil-field equipment, and more specifically to a self-contained and self-powered trailer-integrated frac sand conditioning and elevator system and method with safety features such as preassembled railings on stairway(s) and inspection platform(s) leading to and surrounding a sand-water combining and sifting system, an on-board electrical generator with optional automated ground rod, conduit-enclosed wiring, illumination fixtures, hydraulic elevation (lifting) cylinders and automatic height-locking system, a fold-away sand funnel assembly, a sand input bin optionally configurable for left-hand-side or right-hand-side loading, and high-capacity belt conveyor(s).

BACKGROUND OF THE INVENTION

Oil-field well sites often have unorganized collections of equipment and sand piles where it is difficult to maintain worker safety and efficiency. Labor expenses are a significant portion of operating costs. Worker safety and compliance with Occupational Safety and Health Administration (OSHA) standards are concerns. Modern oil extraction utilizes hydraulic fracturing (often called "fracking") to break underground petroleum geologic formations, such as tight shale layers, that contain oil and/or natural gas. Frac materials such as silica sand, bauxite, kaolin or other clay materials, or glass, are mixed with a liquid such as water and other chemicals to form a slurry, that is pumped at high pressure into a well for the hydraulic-fracturing processes, requiring efficient conveyors, wet sifting and handling systems for the frac materials and slurry. Current systems lack versatility in loading options, integrated safety features, and portability. Current frac-sand handling systems are largely assembled on site, with workers handling up to eleven semi-truck loads of equipment and supplies, with equipment being connected and erected using skilled and unskilled labor to connect the various mechanical, hydraulic, electrical, lighting, control and computer equipment. Typically, prior systems inherently have hydraulic and electrical lines and cables strewn across the ground, creating tripping and safety hazards. Occasionally, because different crews of workers, some of which may be unfamiliar with the various parts, are used to connect the various parts, not all the parts get properly connected. Climbing higher than six feet from the ground on the equipment requires safety harnesses, according to OSHA rules. Conventional systems often lack connection points for safety harnesses. Again, even when the numerous parts are eventually connected, the work site is littered with electrical cables, hydraulic hoses and water pipes strewn across the ground in order to connect spaced-apart electrical generators, hydraulic pumps, motorized conveyor-belt sand elevators, and other equipment such as computers, often separately sourced and individually delivered. It is further a challenge to provide a control-system console to operate such a collection of parts, since different kinds of parts from various different suppliers make it difficult to customize and provide a unified, easy-to-understand and easy-to-operate system console to control the system as a whole.

There remains a need for a frac-sand-elevating and frac-sand-conditioning system with safety features that is easy, safe and quick to set up and knock down at remote locations, that includes safety features, and that quickly elevates large quantities of frac sand, combines water with the sand, and sifts the resulting slurry.

SUMMARY OF THE INVENTION

In some embodiments, the present invention provides a sand-conveyor system operable to be set up into an erected operational configuration, and to be reconfigured into a lowered, compact highway-travel configuration. This system includes: a single trailer suitable for highway travel, wherein onto the trailer are mounted and pre-assembled: an input feed hopper (also referred to herein as an input hopper) configured for receiving side-loaded sand and feeding the sand to a first conveyor; a second conveyor; a sand-liquid blender for mixing a liquid containing water with the sand to form a frac-sand slurry; a vibratory sifter located below the sand-liquid blender for removing debris from the frac-sand slurry; a discharge funnel that is positioned or positionable to a location below the vibratory sifter to receive sifted frac-sand slurry from the vibratory sifter when the system is in its operational configuration, wherein the funnel terminates in a discharge boot to control sifted frac-sand slurry discharge, wherein the first conveyor extends from the hopper to transfer sand onto the second conveyor, wherein the second conveyor is configured to transport sand to the sand-liquid blender; a generator set for powering the system; and automated elevation actuators and height-maintenance locks for erection rigging of the system, eliminating the need for workers to use safety harnesses. In some embodiments, the discharge funnel is repositionable to a swing-away travel position between the second conveyor and the trailer frame when the system is in its lowered, highway-travel configuration. That is, the trailer system and its component parts are pre-assembled into an "integrated" and self-powered system that is erected on site and needs no on-site assembly involving parts that are separately delivered.

In some other embodiments, the present invention provides a portable sand-conveyor system that includes an input hopper configured for receiving sand from either the left or right side, when side-loaded by a front-end loader. In some embodiments, a movable wall associated with the hopper prevents sand from spilling out on the opposite side during loading from either the left or right side. In some embodiments, the input hopper feeds sand onto a first conveyor belt, which transfers it to a second, faster, conveyor belt. The distal end of the second conveyor belt discharges sand into a sand-liquid mixer, creating a slurry that then is dropped onto a vibratory sifter for debris removal. From the sifter, the slurry flows through a funnel hopper terminating in a rubber boot for controlled output to a customer's wellsite equipment for injection into a petroleum well or gas-extraction well. In some embodiments, the funnel hopper is configured to swing away (e.g., to a position between the trailer bed and the second conveyor) for travel. In some embodiments, the entire system, including an electrical generator set and a hydraulic pump and actuator subsystem, is mounted on a highway-transportable trailer. In some embodiments, the entire system includes OSHA-compliant safety features, such as nighttime lighting, safety railings, stairways, an integrated electrical generator set, and a hydraulic pump and actuator subsystem. In some embodiments, substantially all structural components are metallic and electrically grounded. In some alternative embodiments, the system utilizes screw-auger conveyors in place of, or in addition to, belt conveyors for elevating the sand. In some embodiments, all electrical conductors are pre-wired and enclosed in metal conduit, eliminating the need for on-site electricians or electrical connections to external power sources. In some embodiments, all erection rigging employs automated hydraulic and/or electrical actuators and elevation locks, removing the need for workers to climb onto the equipment during erection or use safety harnesses during set up.

BRIEF DESCRIPTION OF THE DRAWINGS

FIG. 1H1 is an enlarged side elevation view of generator set 150 in the operational configuration, with a computer control system 160 having an on-trailer portion 161 and an off-trailer portion 162, according to some embodiments of the present invention.

FIG. 1H2 is an enlarged side elevation view of generator set 150 in the operational configuration, with a computer control system 160 having an entirely on-trailer portion 160', according to some embodiments of the present invention.

FIG. 1I is an enlarged top plan view of belt elevator assembly 120 in the operational configuration, according to some embodiments of the present invention.

FIG. 1J1 is an enlarged top plan view of a rear portion of system 100 showing belt elevator assembly 120 in the travel configuration, according to some embodiments of the present invention.

FIG. 1J2 is a further-enlarged top plan view of a stabilizing foot 1491, according to some embodiments of the present invention.

FIG. 1O is an enlarged side elevation view, with horizontal-line and vertical-line shading on the main frame parts-conveyor-frame system 1200 and trailer-frame system 1400—in the erected operational configuration, according to some embodiments of the present invention.

FIG. 1P1 is a further enlarged side elevation view of a rear portion of system 100 showing height-lock assembly 148 in the highway-travel configuration, according to some embodiments of the present invention.

FIG. 1P2 is a further enlarged side elevation view of a rear portion of system 100 showing height-lock assembly 148 in the operational configuration, according to some embodiments of the present invention.

FIG. 1Q is an enlarged back-end elevation view of sand-and-water blender-sifter-funnel-boot subsystem 130 in the operational configuration, according to some embodiments of the present invention.

FIG. 3A is a top plan view of input feed hopper assembly 110, according to some embodiments of the present invention.

FIG. 3B is an end-section elevation view (from section line 3B of FIG. 3C) of input feed hopper assembly 110 (indicated as 110R) with overflow-spillage-prevention wall 111W on the left side to facilitate right-side loading, according to some embodiments of the present invention.

FIG. 3C is a side elevation view of input feed hopper assembly 110 having grizzly gate 115 to screen out oversize reject-rocks, and feed gate 113 and feed-gate actuator 112 used to limit the height of sand on the conveyor belt 116B of conveyor 116 as it leaves hopper 111, according to some embodiments of the present invention.

FIG. 3D shows front-end elevation views of rotating panel assembly 119 (shown in its two operational positions, left side and right side) used to move overflow-spillage-prevention wall 111W between the left side and right-side, according to some embodiments of the present invention.

FIG. 3E is an end-section elevation view (from section line 3E of FIG. 3C) of input feed hopper 110 (indicated as 110L) with overflow-spillage-prevention wall 111W on the right side to facilitate left-side loading, according to some embodiments of the present invention.

Figure 4A:
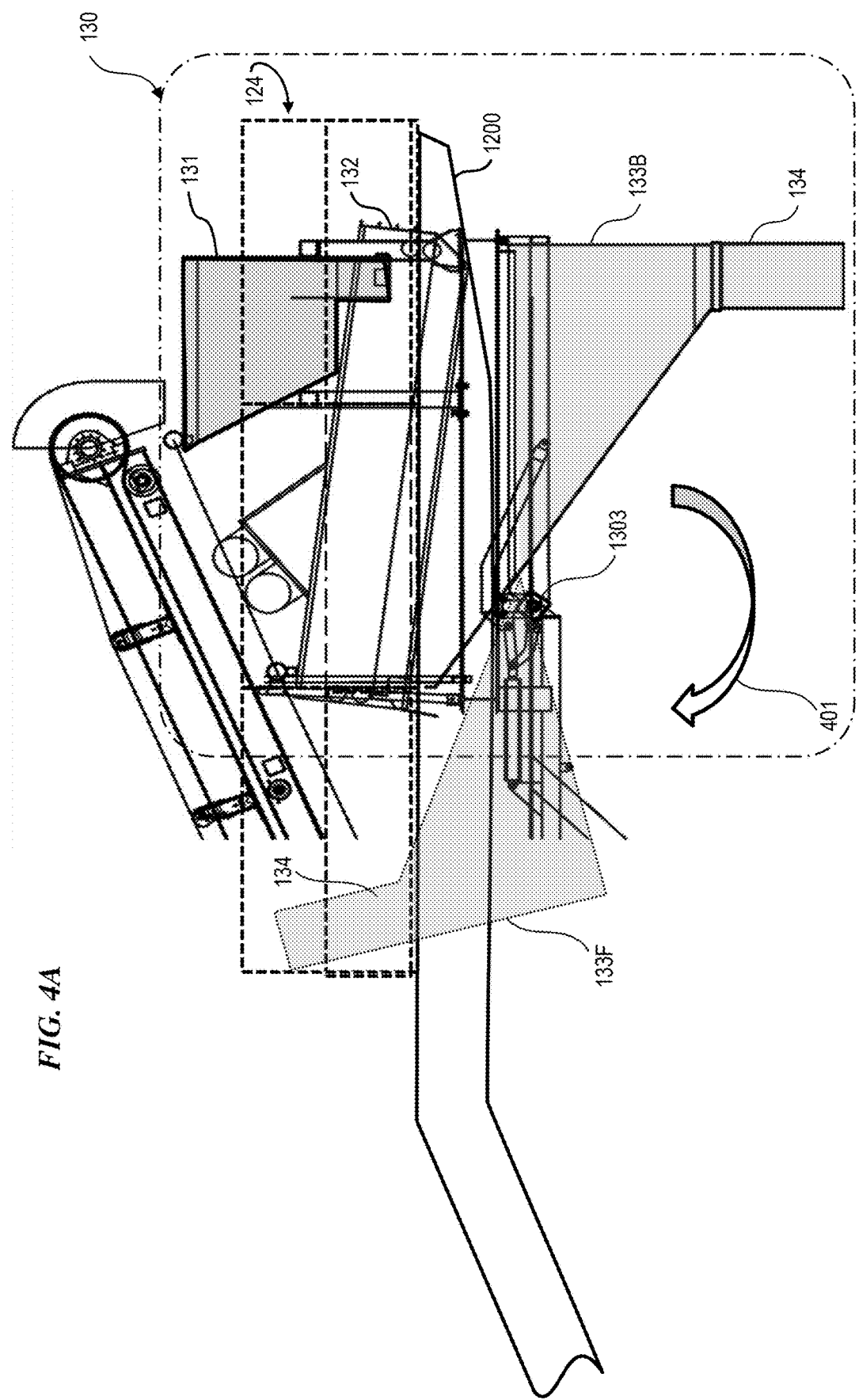

FIG. 4A is a side elevation view of an upper-rear portion of trailer-integrated frac-sand conditioning system 100 in the erected operational configuration, with swing-away funnel 133 and rubber boot 134 in their operational configuration (133B) under derrick screener 132, according to some embodiments of the present invention. The highway-travel configuration of funnel 133 and rubber boot 134 is indicated by 133F.

Figure 4B:
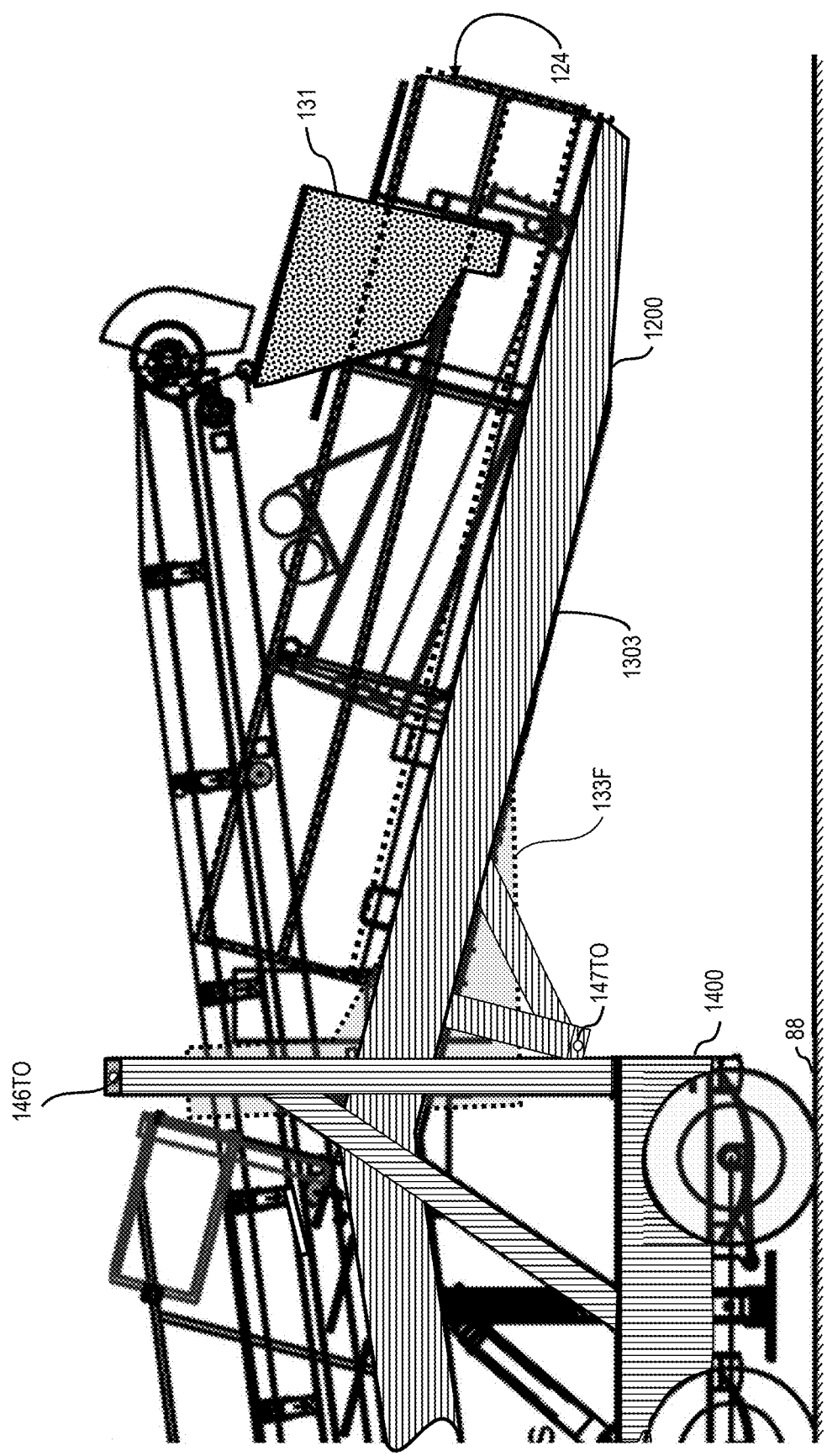

FIG. 4B is a side elevation view of an upper-rear portion of trailer-integrated frac-sand conditioning system 100 in the highway-travel configuration, with swing-away funnel 133 and rubber boot 134 in their swung-forward highway-travel configuration, according to some embodiments of the present invention.

FIG. 5 is a flow chart of a trailer-integrated frac-sand set-up, erection and conditioning method 500, according to some embodiments of the present invention.

FIG. 6A is a block diagram 601 of a distributed control system 160 for executing a trailer-integrated frac-sand conditioning set-up method 500 (with on-trailer component 500.1 and off-trailer component 500.2) and funnel swing-up, de-erection and highway-travel preparation ("take-down") method 700 (with on-trailer component 700.1 and off-trailer component 700.2), according to some embodiments of the present invention.

FIG. 6B is a block diagram 602 of an all-on-trailer control system 160' for executing a trailer-integrated frac-sand conditioning set-up method 500 and funnel swing up, de-erection and highway-travel preparation ("take-down") method 700, according to some embodiments of the present invention.

FIG. 7 is a flow chart of a trailer-integrated frac-sand funnel swing-up, de-erection and highway-travel preparation ("take-down") method 700, according to some embodiments of the present invention.

DETAILED DESCRIPTION OF THE INVENTION

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, the term "trailer-integrated" means that all parts of frac-sand conditioning system 100 are permanently or substantially permanently mounted on a trailer frame that includes axles and wheels that remain assembled as integral parts of each trailer both when system 100 is in its highway-travel configuration, as well as when system 100 is in its operational configuration. This integration increases safety by reducing or eliminating errors in set up and knock down of the system, and ensures that all needed parts are available and assembled when system 100 arrives and leaves a job site. This integration also speeds the set up and knock down of system 100. The term "trailer-mounted" is sometimes used with a similar meaning, but can also, in other instances, refer to a different system that is transported on a trailer, but then moved off the trailer for its operational use, with such a system not being integrated with the trailer.

Figure 1A:
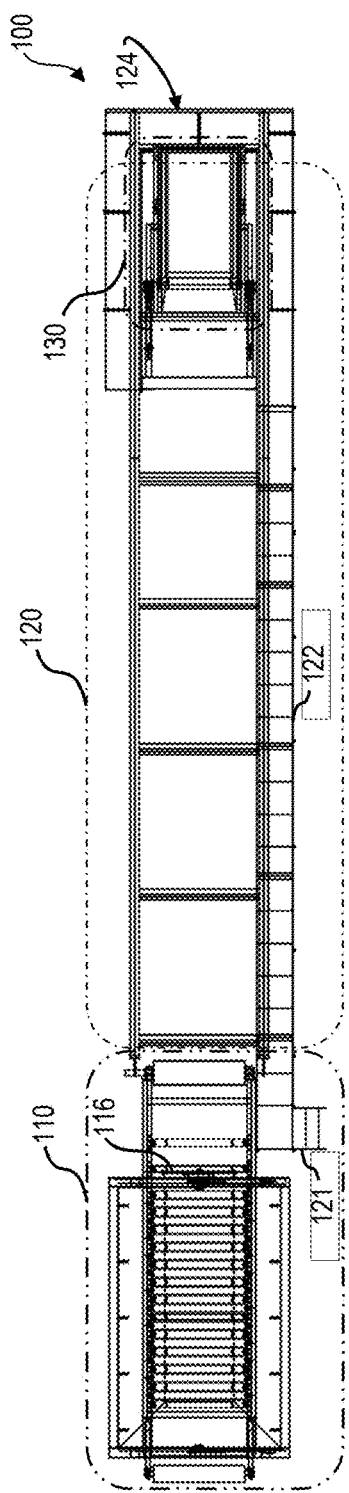
FIG. 1A is a top plan view of a portion of trailer-integrated frac-sand conditioning system 100 in the erected operational configuration, according to some embodiments of the present invention.

FIG. 1A is a top plan view of a portion of trailer-integrated frac-sand conditioning system 100 in the erected operational configuration, according to some embodiments of the present invention. In some embodiments, trailer-integrated frac-sand conditioning system 100 is a self-contained system that includes input hopper assembly 110 that includes first conveyor assembly 116, second conveyor assembly 120 (also referred to herein as elevator assembly 120, subsystem 120, or the like), sand-and-water blender-sifter-funnel-boot subsystem 130, and electrical generator set 150, all mounted on trailer assembly 140 (see FIG. 1C). Some embodiments further include a maintenance/inspection platform 124, including railings and kickboards for worker safety, that surrounds sand-and-water blender-sifter-funnel-boot subsystem 130 on three sides.

Figure 1B:
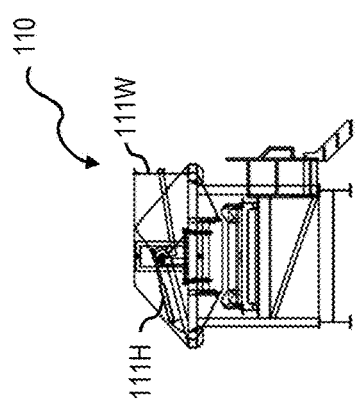
FIG. 1B is a front-end elevation view of input feed hopper assembly 110, according to some embodiments of the present invention.

FIG. 1B is a front-end elevation view of input feed hopper assembly 110, according to some embodiments of the present invention. In some embodiments, input hopper assembly 110 is designed with dual-side accessibility, allowing front-end loaders to deposit frac sand from either the left or right side. In some embodiments, a movable wall 111W associated with hopper assembly 110 is adjustable to the left side or right side. For example, in some embodiments, movable wall 111W is repositioned using a hydraulic cylinder 111H, to the left side when loading sand from the right side, and vice versa, in order to block sand from spilling out on the opposite side during loading.

Figure 1C:
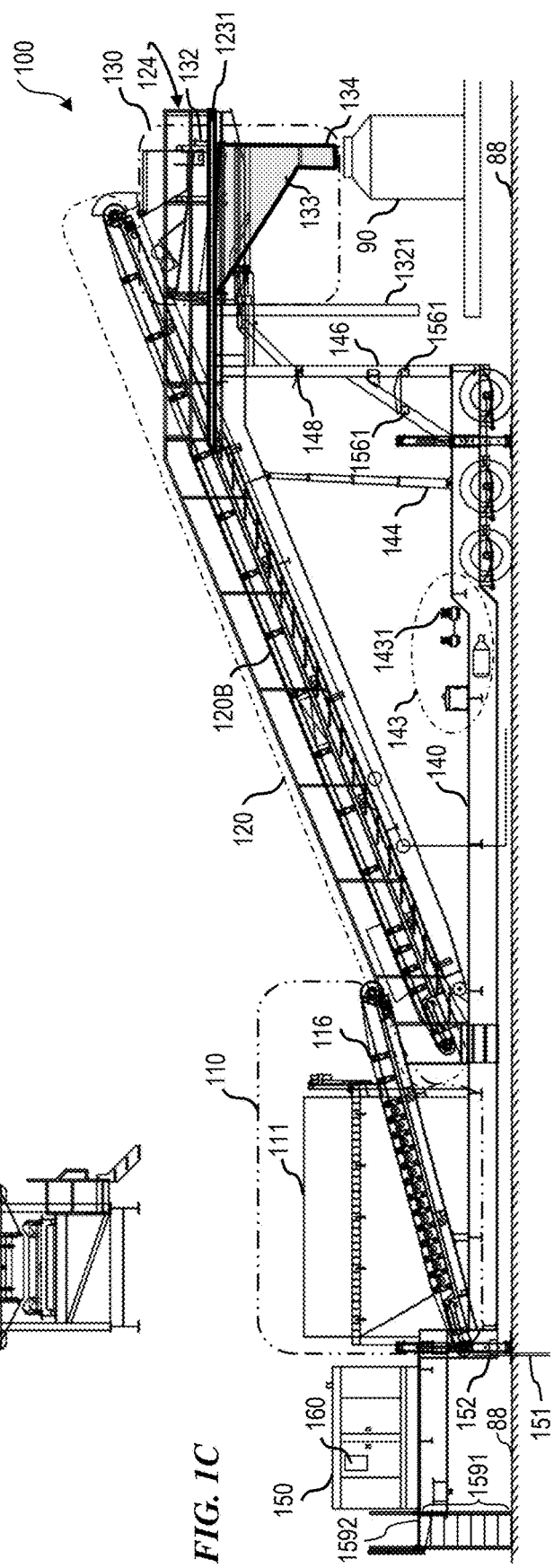
FIG. 1C is a side elevation view of trailer-integrated frac-sand conditioning system 100 in the erected operational configuration, according to some embodiments of the present invention.

FIG. 1C is a side elevation view of trailer-integrated frac-sand conditioning system 100 in the erected operational configuration, according to some embodiments of the present invention. In some embodiments, a first conveyor-belt system 116 includes a conveyor belt 116B (see FIG. 1F—in some embodiments, first conveyor belt 116B is a 23' by 60" belt (23-feet (7 meters) long by 60-inches (1.52 meters) wide)) and a 40-horsepower (HP) motor, and has a 58-feet-per-minute (FPM) (17.7 meters per minute) fixed belt speed, while in other embodiments a screw-auger conveyor rotating at a fixed speed is used instead, to move frac sand along. In some embodiments, first conveyor belt 116B extends from the hopper 111 and is inclined to transfer sand off its upper end onto the second conveyor belt 120B. In some embodiments, second conveyor assembly 120 is a high-speed belt conveyor that includes second conveyor belt 120B (in some embodiments, second conveyor belt 120B includes a 56' by 48" belt (56-feet (17.1 meters) long by 48-inches (1.21 meters) wide), is driven by a 40-HP motor, and has a 170 FPM (51.8 meters per minute) fixed belt speed), while in other embodiments (not shown) a screw-auger conveyor rotating at a fixed speed is used instead, to move frac sand along. Second conveyor belt 120B transports the sand to sand-and-water blender-sifter-funnel-boot subsystem 130 including its vibratory sifter 132. In some embodiments, an FLC 504 Derrick screener (e.g., in some embodiments, a 500-series Flo-Line Cleaner made by the Derrick Corporation) is used for vibratory sifter 132. In some embodiments, vibratory sifter 132 separates oversized debris (which is discarded above ground on site via "overs" discharge chute 1321) from the frac-sand slurry (which is dropped through vibratory sifter 132, then directed by funnel 133 through rubber boot 134 to be pumped down a well by the customer's equipment), ensuring only "clean" sifted frac-sand slurry progresses downstream (e.g., into the customer's frac-mixture equipment 90). Some embodiments of the present invention further include a ground rod 151 and associated hydraulic cylinder 152 (see FIG. 1G), for grounding to the earth ground 88, the electrical-system wiring powered by electrical generator set 150. In some embodiments, an OSHA-compliant generator-set front stairway, or retractable ladder, 1591 provides access to generator-set front walkway 1592. In some embodiments, computer 160 is controllable to activate hydraulic cylinder 152 to drive ground rod 151 a predetermined depth into the ground. In some embodiments, ground rod 151 is a one-inch-diameter steel rod, optionally plated with copper for improved conductivity, that is automatically driven a suitable distance down into the earth ground by hydraulic cylinder 152 as a first step during set up, such that the entire system 100 is grounded to earth ground during the entire set-up and operational phases, providing electrical contact to earth ground for electrical-system safety. Upon completion of operations at a wellsite, the system 100 is lowered to its highway-travel compact configuration, and after all other steps, as a last step, the ground rod 151 is pulled from the earth using hydraulic cylinder 152 so that system 100 is grounded for its entire stay at the wellsite. In some embodiments, hydraulic system 143 includes one or more controllers (in some embodiments, a plurality of manually operable hydraulic control levers 1431 are used to extend or retract the different ones of hydraulic cylinders to get the trailer system 100 either to rise into its erect operational configuration of FIG. 1C or to lower into its compact highway-travel configuration of FIG. 1E) operated by a user to control the erection and set up of system 100 into the erected and operational configuration (and the take down of system 100 into its highway-travel configuration), and one or more hydraulic pumps, which together control and power one or more lift cylinders 144 that lift subsystems 120 and 130, and activate one or more hydraulic pin locks 148 on height-maintaining bracing structure 146 to help ensure a stable operational configuration. In some embodiments, the hydraulic pump(s) of hydraulic system 143 control the flow of hydraulic fluid through tubing to hydraulic cylinder(s) 144. In some embodiments, height-maintaining bracing structure 146 includes an outer beam portion 1462 and a parallel inner beam portion 1463 (see FIG. 1Q) on both the left-hand side and right-hand side of trailer-frame assembly 140 (a total of four portions of vertical beams 146—two outer 1462 portions located at the outer edges of frame 141 and two inner 1463 portions located more towards the center of trailer-frame assembly 140), wherein each vertical beam portion 1462 and 1463 is braced by a corresponding diagonal support beam 1461 extending at an acute angle towards the front of trailer-frame assembly 140 (a total of four diagonal-brace beams 1461—see FIG. 1L). On the bottom left-hand side and right-hand side of walkway or platform 124, an upper beam portion 147 (which is a single beam that is vertical when erected-see FIG. 1L) is similarly braced by a corresponding diagonal support beam 1471 extending at an acute angle towards the back of walkway or platform 124. Each upper beam portion 147 is located between the outer beam portion 1462 and parallel inner beam portion 1463 of vertical supports 146, and the locking pins 148P extend through a through-hole 148TO (see FIG. 1Q) in the top of outer beam portion 1462 of 146, then through a corresponding hole 148TO in the bottom of upper beam portion 147, then through a through-hole 148TO in the top of inner beam portion 1463 of vertical support 146. (When system 100 is not in the erect operational configuration, through-holes 148TO in vertical supports 146 are interchangeably designated as through-holes 146TO, and through-holes 148TO in moveable beam 147 are interchangeably designated as through-holes 147TO. When system 100 is in the erect operational configuration with all through-holes in alignment, for insertion of locking pins 148P, all through-holes are designated 148TO.)

In some embodiments, steel I-beams on the underside of both sides of second conveyor assembly 120 are joined (e.g., by welding) to steel I-beams that are located on the underside of inspection/maintenance platform 124, to support platform 124. In some embodiments, the I-beams on the underside of platform 124 are in a horizontal position when second conveyor assembly 120 is in the elevated, operational position, but when second conveyor assembly 120 is in the lowered, travel position, the I-beams on the underside of platform 124 rest on crossbars 1561 of support structure 146 on one side, and on crossbars 1561 of support structure 146 on the other side (see FIG. 1P1).

One principal advantage of trailer-integrated frac-sand conditioning system 100 of the present invention is that subsystems 110, 120, 130 and 150 are preassembled on trailer assembly 140, so no on-site assembly is needed-system 100 only needs to be erected at the wellsite, and connected to the customer's "water" supply (the "water" from such water supplies typically includes, along with water, other chemicals to aid the petroleum or gas extraction and/or other dissolved chemicals obtained from the underground formations into which the oil well was drilled). In some embodiments, the water-supply connection, fuel for on-board generator set 150, and the frac sand deposited by a front-end loader (not shown) are the only external connections, inputs or supplies to trailer-integrated frac-sand conditioning system 100. In some embodiments, all wiring and electrical devices on system 100 are installed by a licensed electrician when system 100 is originally assembled at a factory, and all of the subsystems of system 100 are electrically grounded to one another and to ground rod 151 (which, in some embodiments, is hydraulically driven into ground earth 88), and no connectors are provided for receiving electrical power into the electrical system installed on system 100, as electrical power to the system is supplied by onboard generator set 150. During erection and operation of system 100 all electrical power is generated on board system 100 by generator set 150, all electrical connections to lighting (e.g., LED lighting) and on-board electrical computers and controllers are pre-wired and enclosed in metal conduit, all hydraulic pumps, tubing, hoses and actuators are pre-installed and powered from on-board motors such that no external power is needed and no on-site assembly of the multitude of subsystems is needed, thus reducing labor costs and possible safety hazards that are associated with conventional frac-sand-handling sets of equipment.

In some embodiments, lifting hydraulic cylinders 144 are used to raise the machine portions 120 and 130 into the erected operational configuration, with hydraulically operated pin locks 148 then securing system 100 into its stable, safe, erected configuration, so no on-site workers are required to climb onto the system 100 during set up (which prevents pinch hazard and fall hazard). The stairways and platforms of system 100 include railings and other protection against human workers and inspectors touching moving parts, and against falling, allowing easy inspection of all external portions of system 100 from above and from below.

In some embodiments, OSHA-compliant lower stairway 121 and conveyor-side stairway 122 (see FIG. 1F and FIG. 1L), OSHA-compliant inspection/maintenance platforms with railings 123 (see FIG. 1G) and pre-wired lighting are incorporated to provide safe access for operators during operation, maintenance and inspections of conveyor system 120 and sand-blender-mixer-sifter system 130. In some embodiments, inspection/maintenance platforms 124 surround the sand-liquid slurry mixer 131 (see FIG. 1J1) and wet-sand vibratory sifter 132, and include safety railings 123 and shields over moving parts to protect workers and inspectors from falling and other injuries, and toe boards 1231 to protect against a worker's foot slipping off the platforms, and to prevent bolts or rocks from dropping off the platform onto people working below. In some embodiments, nighttime lighting 129 and/or 149 (refer to FIG. 1I, FIG. 1J1, FIG. 1L, and/or FIG. 1M) is integrated across the system 100 to facilitate safer operation at night and in low-visibility conditions. In some embodiments, OSHA-compliant generator-set front stairway, or retractable ladder, 1591 provides access to generator-set front walkway 1592 (see, e.g., FIG. 1C and FIG. 1H2).

In some embodiments (refer also to FIG. 1L), when system 100 is in its operational configuration, swing-away funnel 133 is positioned beneath the sifter 132 to allow for controlled redirection of sifted frac-sand slurry. In some embodiments, swing-away funnel 133 is made of sheet steel, is stationary when in operation (note, funnel 133 does not rotate during operation), and ends in a rubber boot 134 to minimize spillage and droplet generation during sifted frac-sand-slurry discharge into the customer's frac-mixture equipment 90.

Figure 1D:
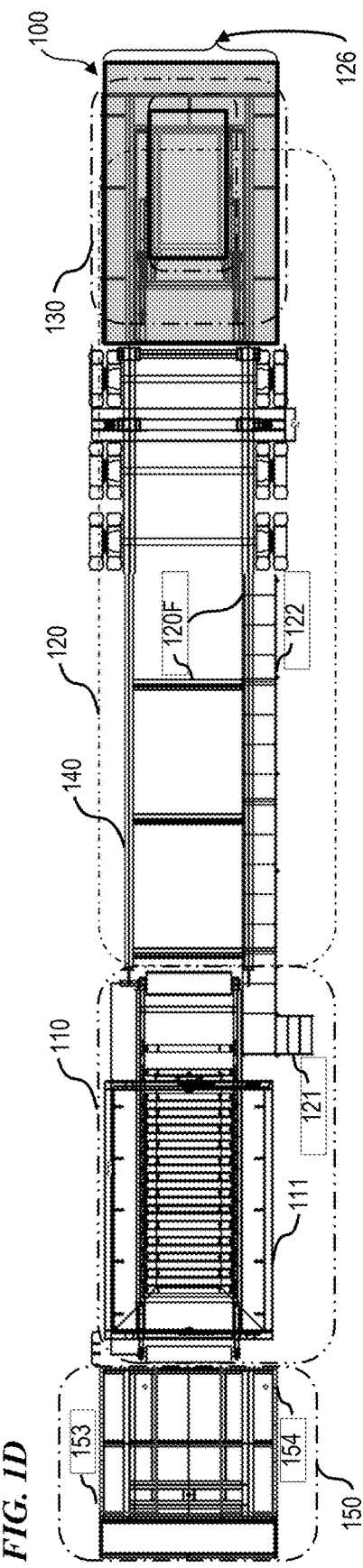
FIG. 1D is a top plan view of trailer-integrated frac-sand conditioning system 100 in the lowered highway-travel configuration, according to some embodiments of the present invention.

FIG. 1D is a top plan view of trailer-integrated frac-sand conditioning system 100 in the lowered highway-travel configuration, according to some embodiments of the present invention. Shown here are top views of generator set 150, input feed hopper assembly 110 with its hopper 111, second conveyor assembly 120, and sand-and-water blender-sifter-funnel-boot subsystem 130, all mounted to trailer assembly 140. Note that in the lowered highway-travel configuration, the total length of system 100 is somewhat extended (e.g., the highway-travel length goes, in some embodiments, to about 93.1 feet (about 28.4 meters) from the operational length of about 92 feet (about 28 meters)).

Figure 1E:
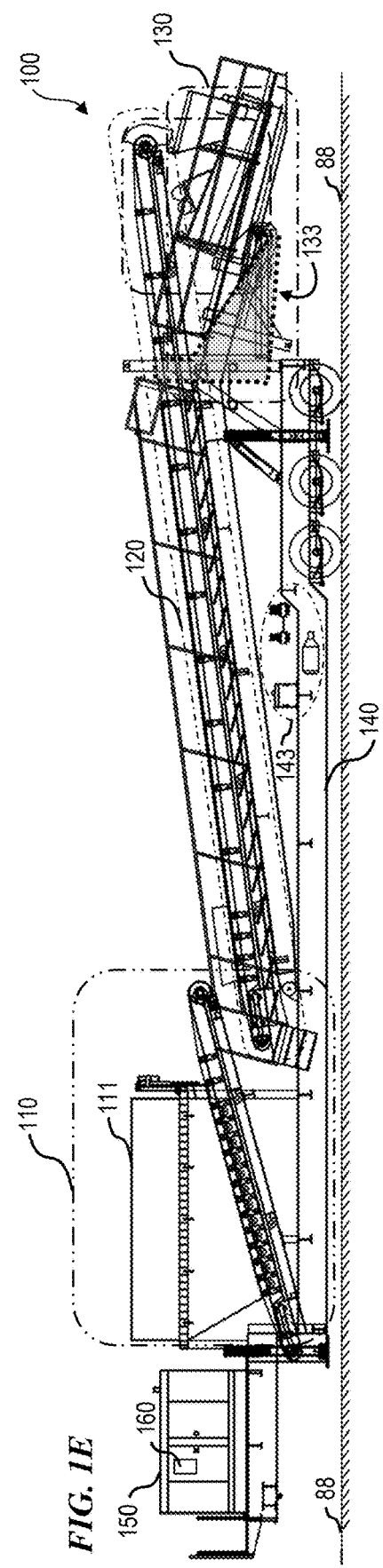
FIG. 1E is a side elevation view of trailer-integrated frac-sand conditioning system 100 in the lowered highway-travel configuration, according to some embodiments of the present invention.

FIG. 1E is a side elevation view of trailer-integrated frac-sand conditioning system 100 in the lowered highway-travel configuration, according to some embodiments of the present invention. In some embodiments, swing-away funnel hopper 133 and boot 134 swing forward and upside-down (refer also to FIG. 1L, which also shows funnel hopper 133 and boot 134 when they are rotated forward, using electrical and/or hydraulic actuators, around a front pivot line 1303, as shown in FIG. 1L) to an upside-down position between trailer assembly 140 (on the lower side) and second conveyor assembly 120 (on the upper side). In some embodiments, hydraulic system 143 includes one or more controllers operated by a user using hydraulic control levers 1431 (see FIG. 1C) to control the unlocking of the one or more hydraulic pin locks 148 on bracing structure 146, and the lowering of system 100 into the highway-travel configuration using the one or more hydraulic pumps, which control and power the one or more lift cylinders 144 that lower subsystems 120 and 130.

Figure 1F:
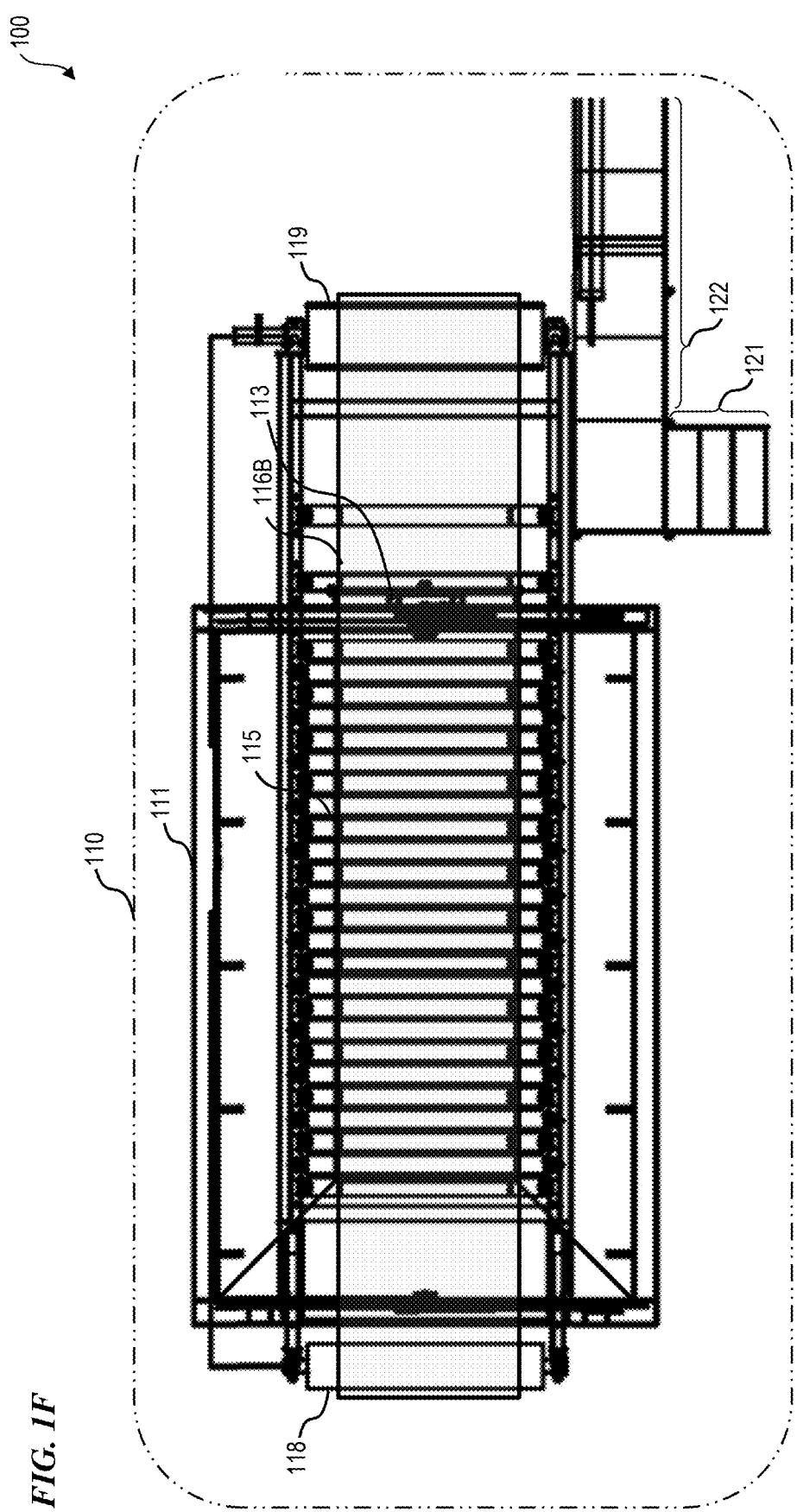
FIG. 1F is an enlarged top plan view of input feed hopper assembly 110 in the operational configuration, according to some embodiments of the present invention.

FIG. 1F is an enlarged top plan view of a portion of system 100 showing input feed hopper assembly 110 in the operational configuration, according to some embodiments of the present invention. In some embodiments, input feed hopper assembly 110 includes hopper 111, a "grizzly grate" 115 (a set of spaced-apart rods that catch and remove unwanted large rocks from the deposited sand), first conveyor belt 116B that travels around the lower front roller 118 to the upper back roller 119 of first conveyor assembly 116, in order to move sand from the bottom of hopper 111 to be dumped from above onto second belt conveyor 120B (as shown in FIG. 1E). In some embodiments, lower stairs 121 and conveyor-side stairs 122 provide solid footing for a worker to easily and safely walk up from ground level to the observation, inspection and maintenance platform 124 (refer also to FIG. 1G and FIG. 1L).

Figure 1G:
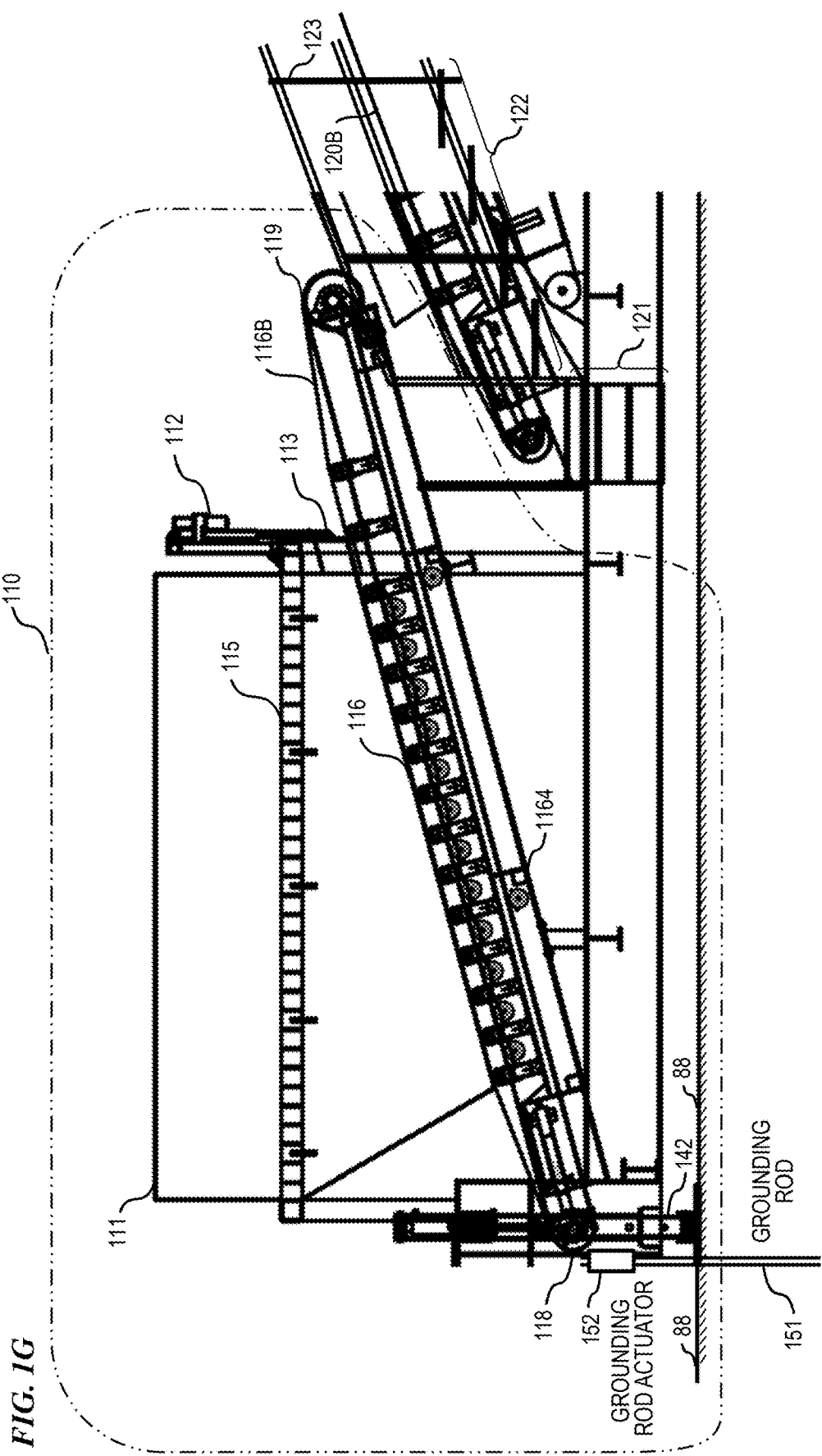
FIG. 1G is an enlarged side elevation view of input feed hopper assembly 110 in the operational configuration, according to some embodiments of the present invention.
Figure 11:
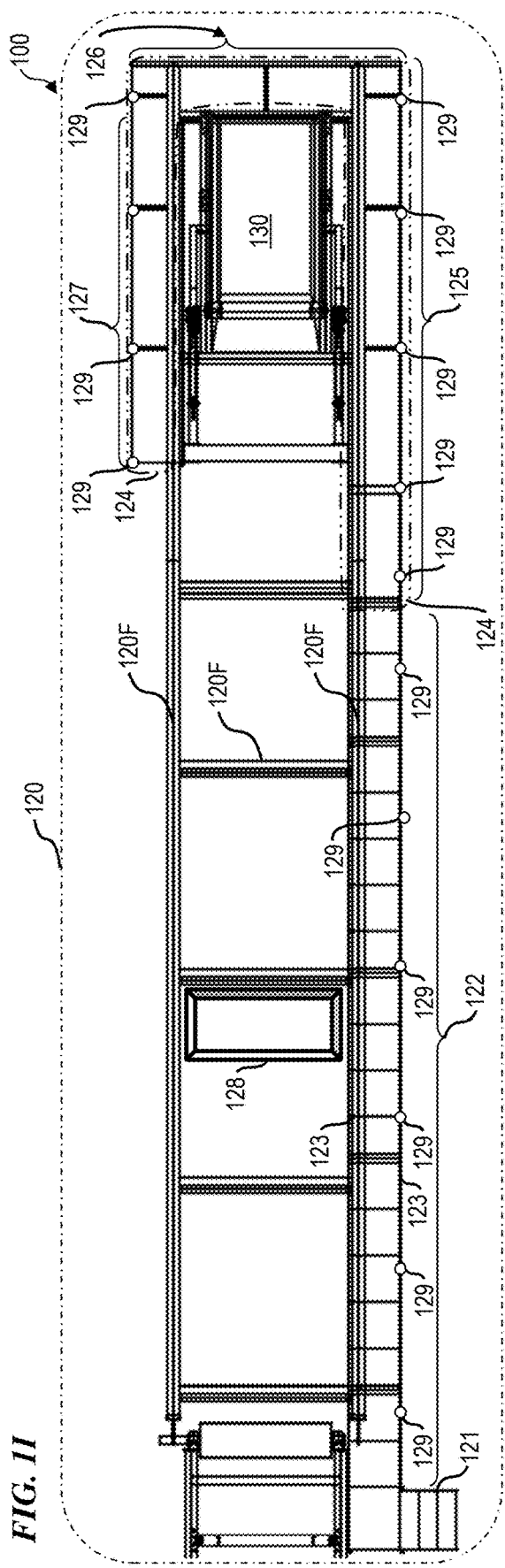

FIG. 1G is an enlarged side elevation view of input feed hopper assembly 110 in the operational configuration, according to some embodiments of the present invention. In some embodiments, input feed hopper assembly 110 includes hopper 111, "grizzly grate" 115, a first conveyor belt 116B that travels around lower front roller 118 and upper back roller 119 of first conveyor assembly 116 to move sand from the bottom of hopper 111 to be dumped off conveyor belt 116B from above onto second belt conveyor 120B, a "knife-edge" gate 113 that is movable in a vertical direction by gate-height actuator 112 (in some embodiments, an electrical gate-height actuator) that is operated to control a height of sand leaving hopper 111 onto first conveyor belt 116B (which in turn controls, at least in part, the amount of sand delivered per unit of time). Some embodiments of the present invention further include a ground rod 151 that provides electrical contact to earth ground 88 for electrical-system safety and, in some embodiments, that is automatically, or by a hydraulic control lever controlling a hydraulic cylinder, driven into the ground by ground-rod actuator 152 or, in other embodiments, manually driven into the earth ground 88 (e.g., by a hand-held hammer), during erection and set up of system 100, so that the grounding protection is not inadvertently omitted (as may happen with conventional systems that require a worker to find and drive a grounding rod into the ground and then find and attach a ground-wire cable to the grounding rod and a suitable connection point on conventional sets of separately assembled equipment, as well as the requirement for someone to electrically connect together each of the separate parts of conventional equipment). In some embodiments, OSHA-compliant lower stairway 121 and conveyor-side stairway 122, and OSHA-compliant inspection/maintenance platforms with railings 123 allow workers to safely walk up to the inspection and maintenance platform(s). In some embodiments, one or more motion sensors 1164 are present that sense whether first conveyor belt 116B is moving properly and prepared to receive sand from hopper 111. In some embodiments, belt 116B is at an incline of 15 degrees, or about 15 degrees, relative to a horizontal level plane (e.g., as indicated by a bubble level). In some embodiments, when conveyor 120 is in its erected and operational orientation, belt 120B is at an incline of 22 degrees, or about 22 degrees, relative to the horizontal level plane. In some embodiments, belt-motion data from the one or more motion sensors 1164 is communicated to computer control system 160.

FIG. 1H1 is an enlarged side elevation view of generator set 150 in the operational configuration, with a computer control system 160 having an on-trailer portion 161 and an off-trailer portion 162, according to some embodiments of the present invention. In some embodiments, generator set 150 includes access doors or equivalent structures to electrical alternator 153 and backup electrical alternator 154, with radiator 155 providing air access for cooling the electrical alternator 153 and backup electrical alternator 154. In some embodiments, ground rod 151 and ground-rod actuator 152 are as described above. In some embodiments, the computer control system 160 includes on-trailer portion 161 housed, at least partially, within the enclosure of generator set 150, or other suitable location on trailer system 100. In some embodiments, the off-trailer portion 162 is implemented in a laptop computer, a touch-screen tablet computer or other suitable system, which executes a portion 500.2 of the computer-implemented set-up and operation method 500 (see FIG. 5), that allows the human user to, for example, sit in a nearby vehicle out of the weather, with the off-trailer portion 162 communicating wirelessly in both directions with the on-trailer portion 161, which executes another portion 500.1 of the computer implemented set-up method 500, when erecting system 100. In a like manner, the off-trailer portion 162 executes a portion 700.2 of the computer-implemented take-down method 700 (see FIG. 7), while communicating wirelessly both directions with the on-trailer portion 161, which executes another portion 700.1 of the computer-implemented take-down method 700, when preparing system 100 for its highway-travel configuration.

FIG. 1H2 is an enlarged side elevation view of generator set 150 in the operational configuration, with an alternative configuration having a computer control system 160 as an entirely on-trailer configuration 160', according to some embodiments of the present invention. In some embodiments, the entirely-on-trailer computer control system 160' executes the computer-implemented set-up and operation method 500, as well as the computer-implemented take-down method 700.

In some other embodiments, human-executed methods equivalent to computer-implemented set-up and operation method 500, as well as the computer-implemented take-down method 700 are guided by paper checklists, or laptop-computer-displayed guidance and checklists, along with the senses of the human operator, instead of or in addition to computer-implemented set-up and operation method 500, as well as the computer-implemented take-down method 700. In some such embodiments, a human operator manually controls hydraulic control levers 1431 (see FIG. 1C and FIG. 1L) to extend or retract the various hydraulic cylinders of system 100.

FIG. 1I is an enlarged top plan view of belt elevator assembly 120 in the operational configuration, according to some embodiments of the present invention. In some embodiments, belt elevator assembly 120 includes second conveyor belt 120B (not shown in this FIG. 1I), lift frame 120F, lower stairway 121 and conveyor-side stairway 122 with their railings 123, a maintenance/inspection/observation unitary platform 124 that includes first-side platform 125, rear-end platform 126 and second-side platform 127. Some embodiments further include a weight sensor (also called belt scale) 128 that measures a weight of sand on belt 120B, either continuously or periodically.

Figure 1K:
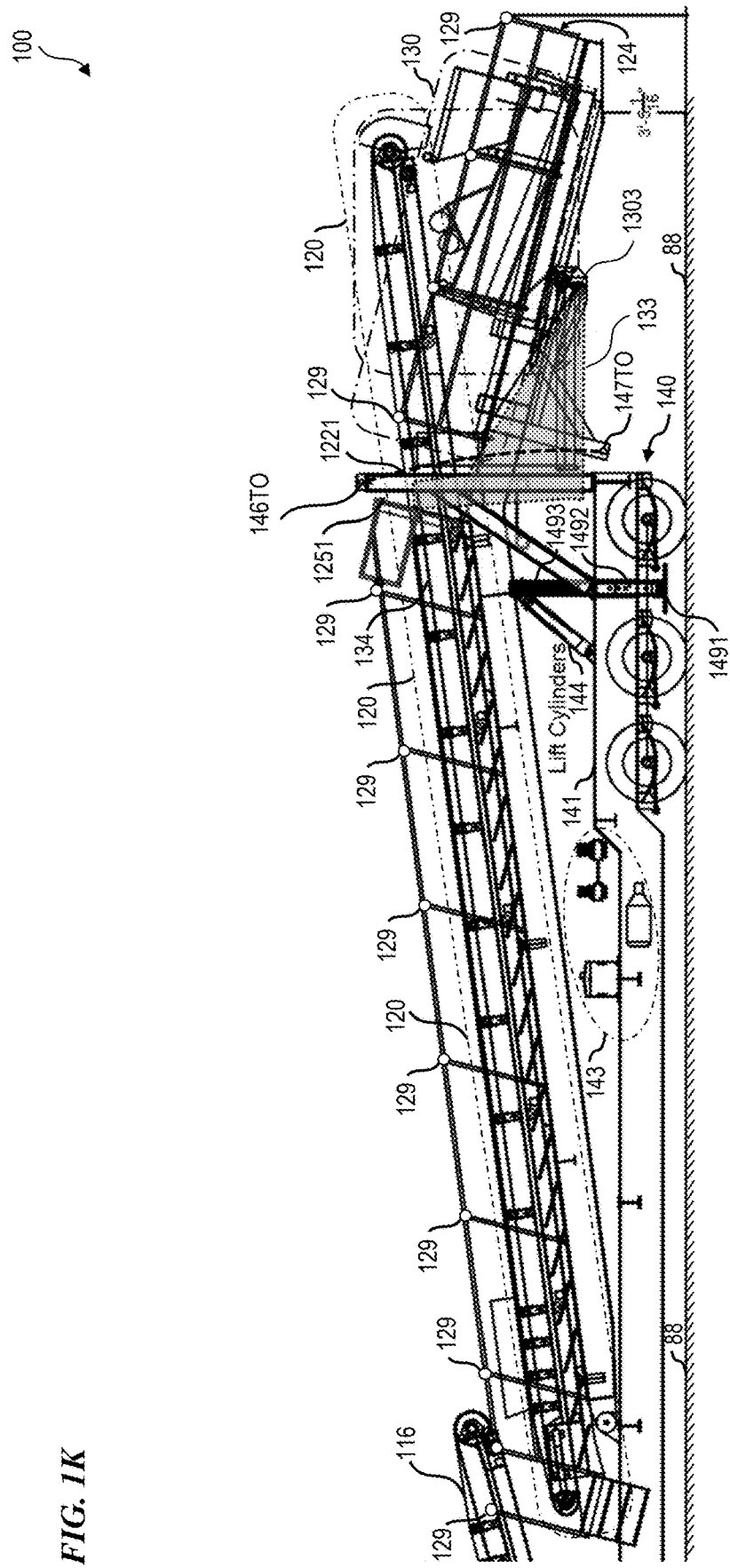
FIG. 1K is an enlarged side elevation view of a rear portion of system 100 showing belt elevator assembly 120 in the travel configuration, according to some embodiments of the present invention.
Figure 1L:
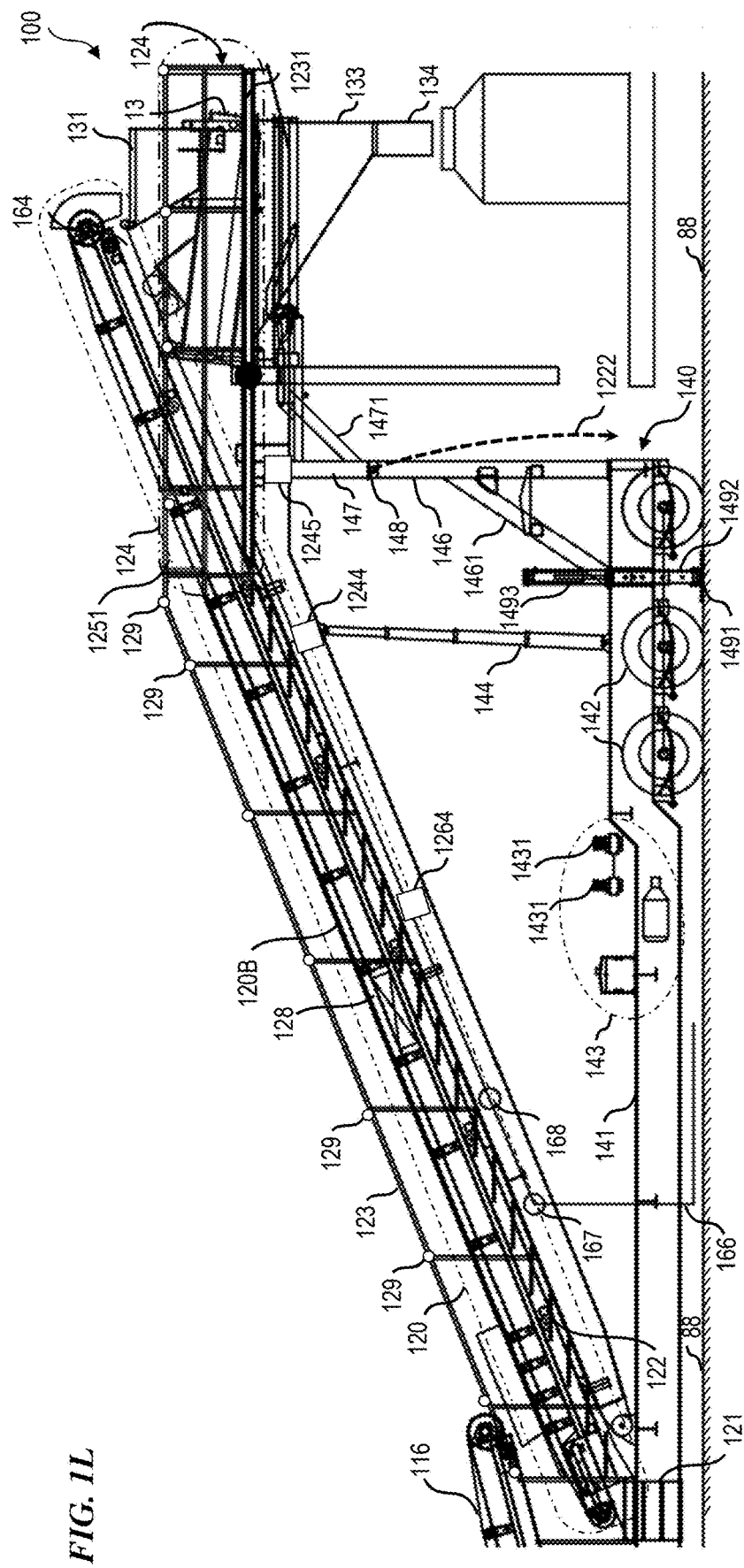
FIG. 1L is an enlarged side elevation view of a rear portion of system 100 showing belt elevator assembly 120 in the operational configuration, according to some embodiments of the present invention.
Figure 1M:
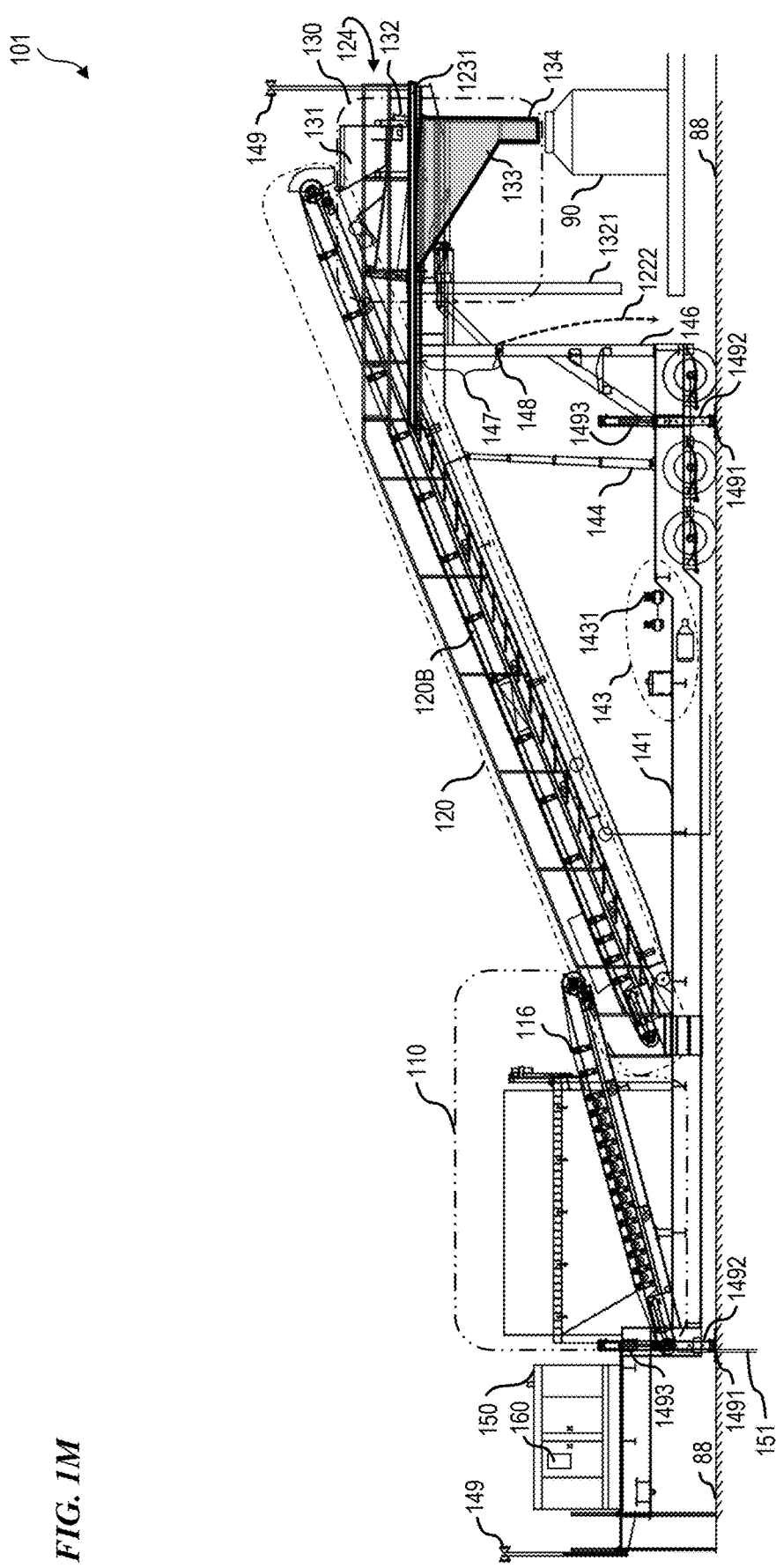
FIG. 1M is a side elevation view of trailer-integrated frac-sand conditioning system 101, which is an alternative embodiment using pole lights 149 in the four outside corners, in the operational configuration, according to some embodiments of the present invention.

In some embodiments, lighting 149 is provided at the four outside corners of system 100, as shown in FIG. 1M. In some other embodiments, as shown in FIG. 1I, a plurality of lights 129 are also or alternatively prewired in metal conduit and spaced along railing 123 that extends around all sides of unitary platform 124 as well as along conveyor-side stairway 122 and/or lower stairway 121, as well as optionally at other locations around system 100.

FIG. 1J1 is an enlarged top plan view of a rear portion of system 100 showing second belt elevator assembly 120 (that includes inspection/maintenance platform 124) in the highway-travel configuration, according to some embodiments of the present invention. Because of the slight arc that second belt elevator assembly 120 travels along when being lowered to the highway-travel configuration, the overall length of system 100 is slightly longer than when in the erected operational configuration. FIG. 1J1 also shows the top plan view of trailer frame 141 and wheels 142. In some embodiments, a front leveling/stabilizing foot 1491F (in some embodiments, 12 feet in length and shaped such as shown in FIG. 1J2, passing under system 100 and optionally extending a distance beyond the left and right sides of other parts of system 100) is located in front of input hopper 111 on frame 141, and is configured to be lowered onto the ground 88 using two or more leveling/stabilizing hydraulic cylinders 1493, and a rear leveling/stabilizing foot 1491R (in some embodiments, 12 feet in length and shaped such as shown in FIG. 1J2, passing under system 100 and optionally extending a distance beyond the left and right sides of other parts of system 100) is located in front of the rear-most wheels 142 but behind the second-most-rear wheels 142, and is configured to be lowered using two or more leveling/stabilizing hydraulic cylinders 1493, in order to stabilize system 100 in its operational configuration. In some embodiments, one or more X-Y-Z tilt sensors 1444 are provided on trailer frame 141 to send data to computer system 160 to be used in controlling leveling hydraulic cylinders 1493, as well as periodically monitoring tilt and sending tilt data to computer system 160 so that any tilt problems with the trailer system 100 can be timely detected and corrected, as well as turning on alarms when certain tilt problems arise, to help prevent workers from being hurt. In some embodiments, a plurality of hydraulic control levers 1431 (see FIG. 1L) are used to control the extension or retraction of the different ones of hydraulic cylinders 1493 attached to pillars 1492 that are used to lower and press each stabilizing-and-leveling foot 1491 on earth ground 88 to support system (or apparatus) 100.

FIG. 1J2 is a further-enlarged top plan view of a stabilizing-and-leveling foot 1491 (in some embodiments, used for each foot 1491F and 1491R), according to some embodiments of the present invention. In some embodiments, each stabilizing-and-leveling foot 1491 is made from 1-inch-thick (2.54-cm-thick) steel, and extends twelve feet (3.65 meters) end-to-end, with a wider center eight-foot-long (2.43 meters long) portion being two-feet six-inches (about 0.76 meters) wide, so as to avoid the need for supplemental earth-surface blocking that otherwise might be needed to prevent any leveling foot 1491 from sinking into the earth, and each of the two end portions being two-feet long and somewhat narrower (at two-feet—about 0.61 meters-wide) than the center section, in order to provide space between the back tires. In some other embodiments (not shown), each stabilizing-and-leveling foot 1491 extends fourteen feet (4.26 meters) end-to-end, and about two-feet (about 0.61 meters) wide. In still other embodiments, still other lengths, widths, and/or thicknesses are used for each foot 1491.

FIG. 1K is an enlarged side elevation view of a rear portion of system 100 showing second belt elevator assembly 120 in the travel configuration, according to some embodiments of the present invention. In some embodiments, swing-away platform and railing 1251 swings upward and around when system 100 is being reconfigured to its highway-travel configuration in order to provide space for swing-away hopper 133 and boot 134 to be swung around pivot axis 1303 forward and up between trailer frame 141 and second belt conveyor assembly 120. In some embodiments, the plurality of hydraulic control levers 1431 (see FIG. 1L) are used to retract the different ones of hydraulic cylinders 1493 to raise each stabilizing foot 1491 end attached to pillars 1492, to get the trailer in its highway-travel configuration. In some embodiments, to reconfigure this highway-travel configuration to the operational configuration of FIG. 1L, the second conveyor 120 is lifted by extending lift cylinders 144 that raise the through-hole 147TO at the bottom of beam 147 along path 1221 to align with through-hole 146TO at the top of beam 146. As described herein, when through-hole 147TO is aligned with through-hole 146TO, the pair together is referred to as through-hole 148TO.

FIG. 1L is an enlarged side elevation view of a rear portion of system 100 showing belt elevator assembly 120 in the operational configuration, according to some embodiments of the present invention. In some embodiments, trailer assembly 140 includes a plurality of wheels 142, hydraulic system 143, a plurality of lift cylinders 144, two or more leveling cylinders 1493 attached to each foot 1491, height-maintaining lower brace structure 146, one or more moveable upper brace beams 147 that hold belt elevator assembly 120 in place once elevated by lift cylinders 144, and one or more hydraulic pin-lock assemblies 148 that lock upper brace beams 147 in place at the top of lower brace structure 146. In some embodiments, the only connection to external supplies is water connection 166, which is connected via pipes and/or hoses through water valve 167 and water meter 168 to sand-and-water blender 131. In some embodiments, swing-away platform and railing 1251 forms a portion of platform and railing assembly 124 when system 100 is in the operational configuration, and swings upward and around when system 100 is being reconfigured to its highway-travel configuration in order to provide space for swing-away hopper 133 and boot 134 to be swung forward and up between trailer frame 141 and second belt conveyor assembly 120 (see FIG. 1N, FIG. 4A, and FIG. 4B). In some embodiments, one or more X-Y-Z angle sensors 1244 sense whether elevator 120 has been elevated to its operational angle, and/or one or more height-extension sensors 1245 sense whether elevator 120 has been elevated to a sufficient height, with the sensed data being sent to computer 160 (some embodiments sense height on both the left and right sides of elevator assembly 120, and computer 160, based on each height value, sends signals to apply whatever hydraulic fluid may be necessary to the appropriate left-hand or right-hand side lift cylinder 144 to achieve desired operating criteria). In some embodiments, the one or more X-Y-Z angle sensors 1244 and/or one or more height-extension sensors 1245 communicate their sensed data to computer system 160, which uses that data to control the lift cylinders 144 and hydraulic pin locks 148 to safely erect and maintain system 100 in its operational configuration. In some embodiments, to reconfigure this operational configuration of FIG. 1L to the highway-travel configuration of FIG. 1K, the second conveyor 120 is lowered by contracting lift cylinders 144 (by releasing hydraulic fluid), which lowers the through-hole 147TO at the bottom of beam 147 along path 1222 to its highway-travel position shown in FIG. 1K.

FIG. 1M is a side elevation view of trailer-integrated frac-sand conditioning system 101, which is a preferred alternative embodiment using pole lights 149 in the four outside corners of system 101, in the operational configuration, according to some embodiments of the present invention. In some embodiments, system 101 is substantially identical to system 100 described above, with the exception of the nighttime lighting being lighting fixtures 149 located at the tops of four poles located at the outer-most corners of system 101. In some embodiments, system 101 further includes lighting fixtures on some or all of the railing 123 surrounding platform 124 and/or the railings 123 of stairways 121, 122 (see FIG. 1I), and/or ladder 1591 (see FIG. 1H1).

Figure 1N:
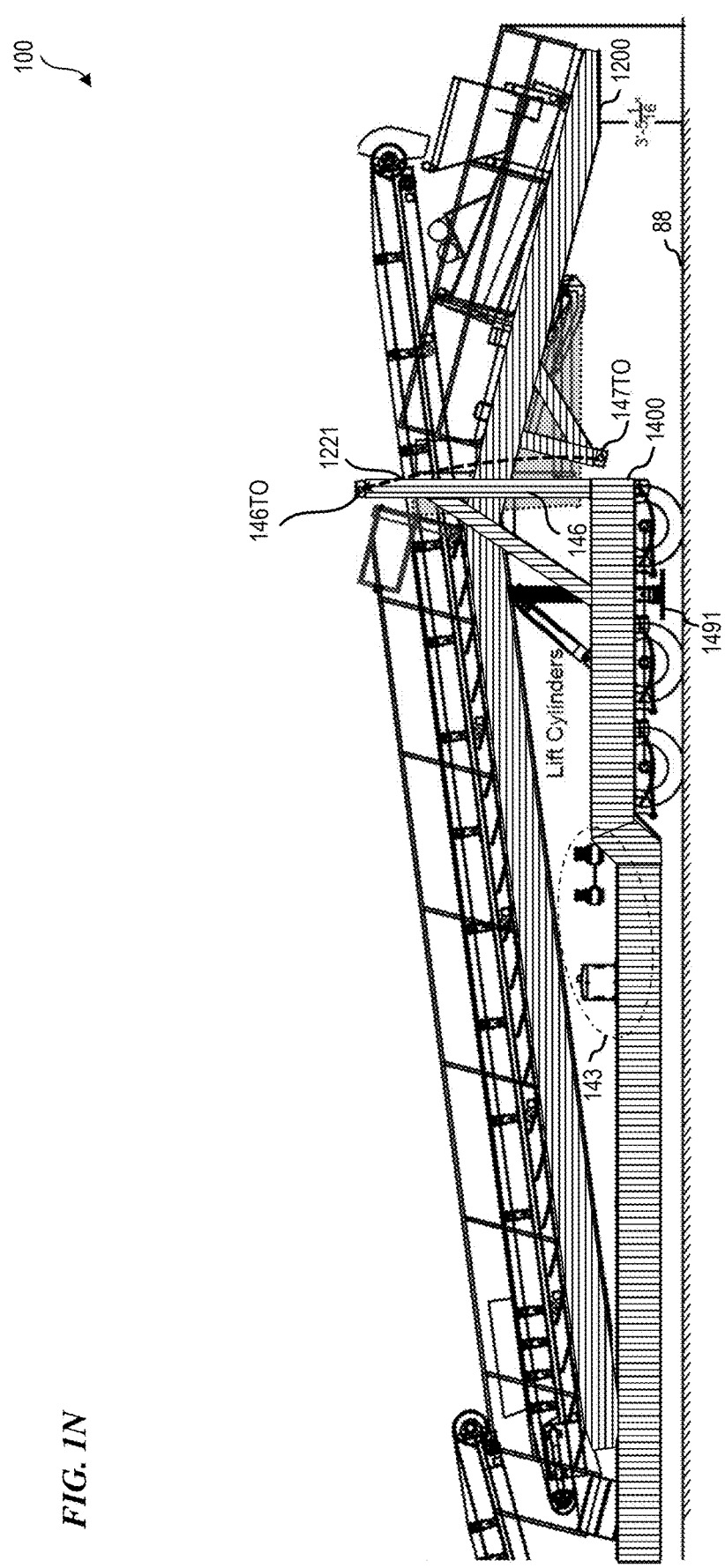
FIG. 1N is an enlarged side elevation view, with horizontal-line and vertical-line (cross-hatched) shading on the main frame parts-conveyor-frame system 1200 and trailer-frame system 1400—in the lowered highway-travel configuration, according to some embodiments of the present invention.
Figure 10:
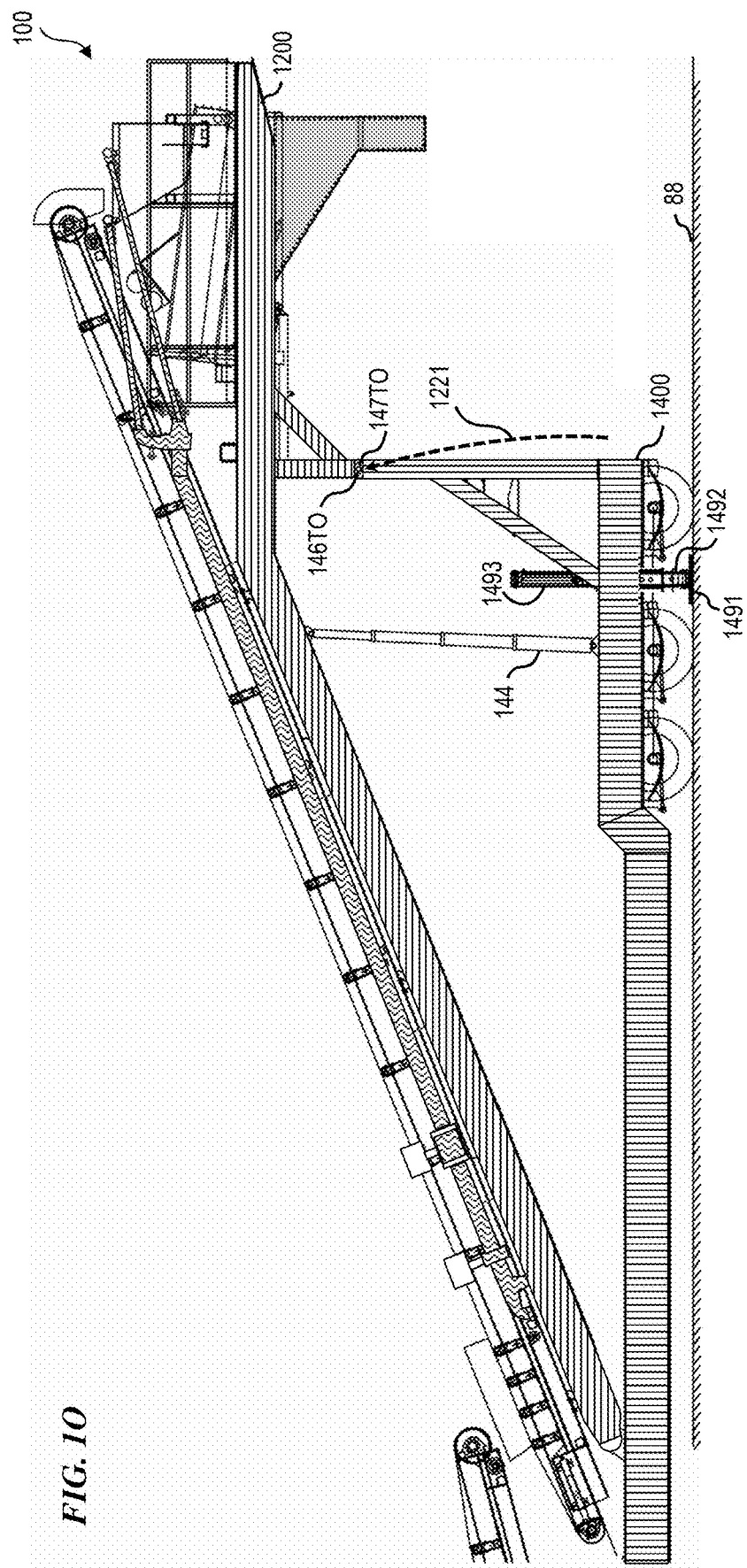

FIG. 1N is an enlarged side elevation view of a rear portion of system 100, with horizontal-line and vertical-line (cross-hatched) shading on the main frame parts-conveyor-frame system 1200, which includes belt elevator assembly 120, and trailer frame system 1400, which includes trailer-frame assembly 140—in the lowered highway-travel configuration, according to some embodiments of the present invention. Main conveyor frame part 1200 carries second conveyor assembly 120 and sand-and-water blender-sifter-funnel-boot subsystem 130, and is configured to be raised relative to trailer frame system 1400 using lift cylinders 144. For better visualization, conveyor-frame system 1200 has cross-hatching lines parallel to level earth 88, and trailer-frame system 1400 has cross-hatching lines perpendicular to level earth 88.

FIG. 1O is an enlarged side elevation view of a rear portion of system 100, with horizontal-line and vertical-line (cross-hatched) shading on the main frame parts-conveyor-frame system 1200 and trailer-frame system 1400—in the erected operational configuration, according to some embodiments of the present invention. For better visualization, main conveyor-frame system 1200 is marked with horizontal fill lines parallel to level earth 88, and trailer frame system 1400 is marked with vertical fill lines perpendicular to level earth 88. Relative to the configuration shown in FIG. 1N, the hydraulic cylinders 1493 have extended to lower stabilizing foot 1491 to the ground 88, where the two ends of stabilizing foot 1491 are attached to their respective pillar 1492. Also, lift cylinders 144 have extended and lifted main conveyor-frame system 1200 relative to trailer frame system 1400 such that through-opening 147TO has moved along path 1221 to now align with though openings 146TO at the top of support beam 146 such that the locking pins 148P (see FIG. 1Q) are inserted through the aligned through-openings 146TO and 147TO.

FIG. 1P1 is a further-enlarged side elevation view of a rear portion of system 100 showing height-lock assembly 148 in the highway-travel configuration, according to some embodiments of the present invention. In some embodiments, to reconfigure this highway-travel configuration to the operational configuration of FIG. 1L, the second conveyor 120 is lifted by extending lift cylinders 144, which causes main conveyor frame part 1200 to move upward, raising the through-hole 147TO at the bottom of beam 147 along path 1221 to align with through-holes 146TO at the tops of outer beam 1462 and inner beam 1463 of support beam 146. Once through-hole 147TO is aligned with through-holes 146TO (as shown in FIG. 1P2, with the aligned through-holes positioned at the unlabelled circle on structure 146 located to the right of reference number 1484), the pin-lock mechanism 148 activates to push pin 148P (see FIG. 1Q) through the aligned holes of through-hole 147TO and through-holes 146TO. Again, as described herein, when through-hole 147TO is NOT aligned with through-holes 146TO as shown in FIG. 1P1, they are referred to separately, but when through-hole 147TO is aligned with through-holes 146TO as shown in FIG. 1P2, the pair together is referred to as through-hole 148TO.

FIG. 1P2 is a further-enlarged side elevation view of a rear portion of system 100 showing height-lock assembly 148 in the operational configuration, according to some embodiments of the present invention. In some embodiments, each height-lock assembly 148 includes a hydraulic cylinder 148H that pulls on a pivot lever 148L (see FIG. 1Q) to push a lock pin 148P into through-hole 148TO (see FIG. 1Q) that pass through the top of outer beam 1462, the bottom of moveable beam 147, and the top of inner beam 1463. On each side of trailer-integrated frac-sand conditioning system 100, outer beam 1462 and inner beam 1463 form a U-shaped (or "forked") structure of vertical support structure 146, and as conveyor assembly 120 is elevated by lift cylinders 144 the I-beams that support the underside of platform 124 on either side are moved up through the space between outer beam 1462 and inner beam 1463. Upper support beams 147 on both sides of system 100 are welded to the undersides of the I-beams (which are part of moveable conveyor-frame system 1200—see FIG. 1N) that support the underside of platform 124, and with conveyor assembly 120 in the lowered, highway-travel configuration, upper support beams 147 are situated at a small distance behind vertical support structures 146 (comprised of outer beam 1462 and inner beam 1463) and at an acute angle to it. As conveyor assembly 120 is elevated by lift cylinders 144, upper support beams 147 on both sides of system 100 are moved along an arc that is nearly vertical up between and along the back sides of outer beams 1462 and inner beams 1463, moving in the arc closer forward toward outer beams 1462 and inner beams 1463 as moveable beams 147 move upward, until moveable beams 147 are near the tops of outer beams 1462 and inner beams 1463, at which point moveable beams 147 are in a substantially vertical position, and positioned in line with, and in between, outer beams 1462 and inner beams 1463, with through-holes 146TO and 147TO in alignment, and being then referenced as through-holes 148TO.

In some embodiments, a metal pipe is inserted through a hole in upper support beam 147 near its bottom and welded to upper support beam 147, with the pipe extending on both sides of the width of beam 147, with the pipe forming through-opening 148TO (referenced as 147TO in description of FIG. 1P1) in upper support beam 147. In some embodiments, the ends of the pipe that forms through-opening 148TO in upper support beam 147 extend beyond the width of moveable beam 147, terminating just slightly short of the distance between moveable beam 147 and outer beam 1462 on one side, and inner beam 1463 on the other side. In some embodiments, a metal plate, in which an inverted V-shaped slot is cut out, is welded to the insides of outer beam 1462 and inner beam 1463, at their tops. In some embodiments, the through-opening 148TO (referenced as 146TO in description of FIG. 1P1) near the top of outer beam 1462 opens to the inverted V-shaped space in the metal plate welded on its top-inside, and the through-opening 148TO near the top of inner beam 1463 opens in the inverted V-shaped slot in the metal plate welded on its top-inside surface. In some embodiments, the inverted-V shaped slots on the inside tops of outer beam 1462 and inner beam 1463 capture the outer ends of the pipe that forms through-opening 148TO at the bottom of moveable upper support beam 147, as beam 147 reaches its top-most height, and then lock pin 148P is inserted to lock system 100 in the erected operational configuration, as described next. In some embodiments, once the inverted V-shaped slots in the metal plates at the top-insides of outer beam 1462 and inner beam 1463 have captured the outer ridges of through-opening 148TO at the bottom of moveable beam 147 (which means that the lift cylinders 144 have fully erected the conveyor portion 120), a human operator activates the locking pin assembly 148 until the locking pins 148P are fully seated, to lock system 100 in the erected operational configuration (with lock pin 148P inserted through through-opening 148TO of outer beam 1462, through-opening 148TO of moveable beam 147, and through-opening 148TO of inner beam 1463, on each side of system 100). Some other embodiments further include a lock-pin sensor 1484 that senses whether each lock pin 148P is fully seated, and the resulting sensed "locked" signal is transmitted to computer 160. In some embodiments, when system 100 is being reconfigured to its highway-travel configuration, hydraulic cylinder 148H pushes on a pivot lever 148L to pull lock pins 148P out from through-openings 148TO. In some embodiments, a plurality of brace beams 1461 are welded to bracing structure 146 to make it rigid.

In some other embodiments, electric actuators are used in place of hydraulic cylinder(s) 148H and/or pivot lever(s) 148L, to insert lock pin 148P into, and later remove lock pin 148P from, through-openings 148TO.

FIG. 1Q is an enlarged back-end elevation view of belt elevator assembly 120 in the operational configuration, according to some embodiments of the present invention. The left-hand side of FIG. 1Q shows lock pin 148P in the "in" (locked) position, and the right-hand side of FIG. 1Q shows lock pin 148P in the "out" (unlocked) position. In some embodiments, one or more horizontal brace beams 1465 and a plurality of diagonal brace beams 1466 are welded to inner bracing structure 1463 to make it rigid, with crossbars 1561 welded between inner beam 1463 and outer beam 1462 of support structure 146.

In some embodiments, all metallic components are electrically connected and grounded for worker safety and to prevent static electricity build-up and thus reduce the risk of fire or explosion.

In some embodiments, all erection rigging is operated via manual or automated hydraulic actuators and automated height locks, eliminating the need for workers to climb onto system 100, or wear safety harnesses or manually handle rigging during set up.

Portability: In some embodiments, the entire system 100 is integrated on a single trailer chassis 141, making it suitable for highway travel, as well as eliminating the need for workers to connect a plurality of subsystems delivered on separate vehicles (reducing labor costs and minimizing safety concerns). An electrical generator set 150 and hydraulic system 143 are mounted on the trailer to provide power for the conveyor belts, vibratory sifter, lighting, and auxiliary systems, ensuring safe operability in remote locations.

Material Construction: In some embodiments, all major mechanical parts that provide structural strength, including hopper assembly 110, second conveyor assembly 120, sand-and-water blender-sifter-funnel-boot subsystem 130, and structural components of trailer assembly 140, are constructed from a durable metal, such as steel, stainless steel, and/or aluminum to ensure worker safety, electrical grounding, structural longevity and reliability. In some embodiments, all electrical conductors are pre-wired and enclosed in metal conduit, eliminating the need for on-site electrical connections, externally sourced electrical or hydraulic power, or electricians.

Figure 2D:
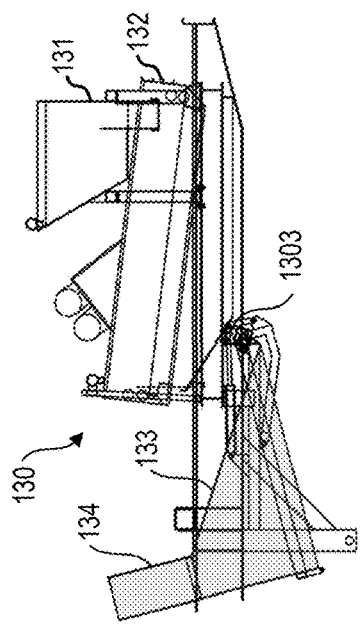
FIG. 2D is a side elevation view of an upper-rear portion of sand-and-water blender-sifter-funnel-boot subsystem 130 showing swing-away funnel hopper 133 and rubber boot 134 in the rotated-forward highway-travel configuration, according to some embodiments of the present invention.
Figure 2E:
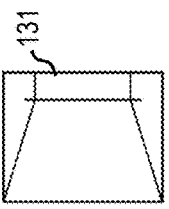
FIG. 2E is a top plan view of sand-and-water blender 131, according to some embodiments of the present invention.
Figure 2C:
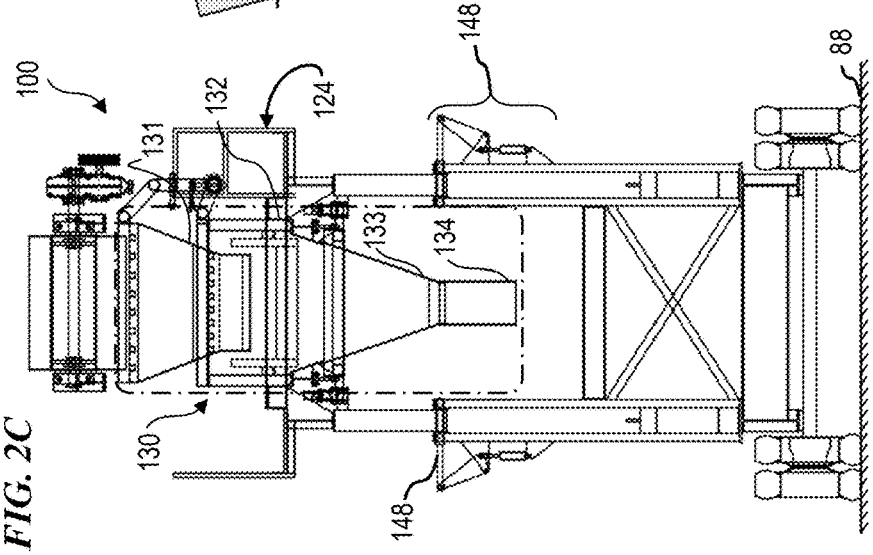
FIG. 2C is a rear-end elevation view of trailer-integrated frac-sand conditioning system 100 in the erected operational configuration, showing sand-and-water blender 131, derrick screener 132, swing-away funnel 133 and rubber boot 134, according to some embodiments of the present invention.
Figure 2A:
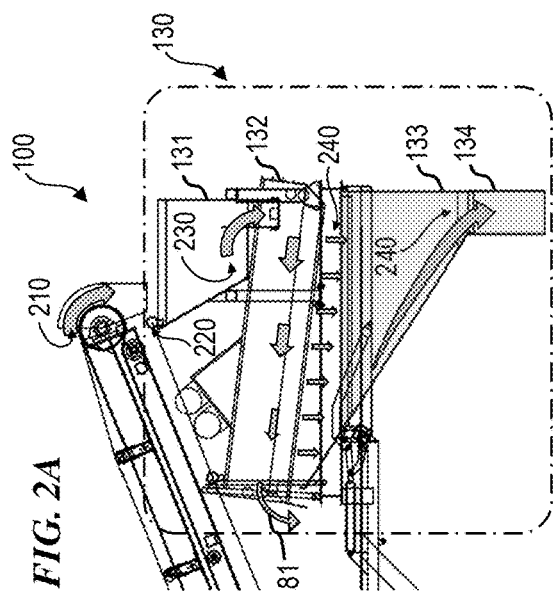
FIG. 2A is a side elevation view of an upper-rear portion of trailer-integrated frac-sand conditioning system 100 in the erected operational configuration, with a drawing of sand-and-water blender-sifter-funnel-boot subsystem 130 superimposed, with arrows showing the flow sequence for conveying sand and water into sand-and-water blender 131, then through derrick screener 132 which sifts out any remaining debris, then through swing-away funnel 133 and rubber boot 134, according to some embodiments of the present invention.

FIG. 2A is a side elevation view of an upper rear portion of trailer-integrated frac-sand conditioning system 100 in the erected operational configuration, with a drawing of sand-and-water blender-sifter-funnel-boot subsystem 130 superimposed with arrows for the flow sequence for conveying sand 210 and water 220 into sand-and-water blender 131, then the sand and water slurry 230 goes through derrick screener 132, which discards debris 81, while the sifted frac-sand slurry 240 drops through swing-away funnel 133 and rubber boot 134 into the customer's frac-mixture equipment 90 (see figures described above), according to some embodiments of the present invention.

Figure 2B:
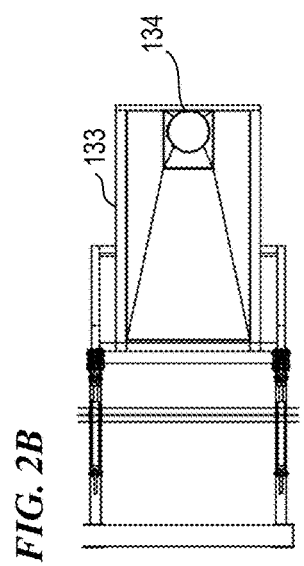
FIG. 2B is a top plan view of a portion of swing-away funnel 133 and rubber boot 134, according to some embodiments of the present invention.

FIG. 2B is a top plan view of a portion of swing-away funnel 133 and rubber boot 134, according to some embodiments of the present invention.

FIG. 2C is a rear-end elevation view of trailer-integrated frac-sand conditioning system 100 in the erected operational configuration, showing sand-and-water blender 131, derrick screener 132, swing-away funnel 133 and rubber boot 134, according to some embodiments of the present invention. Some embodiments include one or more height-lock assemblies 148, which, in some embodiments, each includes a hydraulic cylinder 148H, a pivot lever 148L, a lock pin 148P, and through openings 148TO as described above. In other embodiments, electrical actuators are used to engage and disengage pin(s) 148P. In still other embodiments, other mechanisms are used in place of, or in addition to, the one or more height-lock assemblies 148, to provide redundant safety measures. In some embodiments, a plurality of lock-pin sensors 1484 (see FIG. 1P2) are used to sense whether all lock pins are sufficiently seated and locked, and data from the sensors is sent to computer system 160. In some embodiments, belt-motion data is generated from one or more motion sensors 1264 (see FIG. 1L) that sense whether second conveyor belt 120B is moving properly, and the sensed data is sent to computer system 160.

FIG. 2D is a side elevation view of an upper-rear portion of sand-and-water blender-sifter-funnel-boot subsystem 130 showing swing-away funnel hopper 133 and rubber boot 134 swung around pivot axis 1303 positioned in the rotated-forward highway-travel configuration relative to conveyor subsystem 120, according to some embodiments of the present invention. After the swing-away funnel hopper 133 and rubber boot 134 have been swung around pivot axis 1303 to the rotated-forward highway-travel configuration, the conveyor subsystem 120, observation-platform-and-railing structure 124 and sifter system 130 can be lowered to their lowered highway-travel configuration, which could not happen with swing-away funnel hopper 133 and rubber boot 134 swung towards the back of system 100 in the operational configuration, because of lack of ground clearance.

FIG. 2E is a top plan view of sand-and-water blender 131, according to some embodiments of the present invention.

FIG. 3A is a top plan view of input feed hopper assembly 110, according to some embodiments of the present invention. Shown here are the top view of feed gate 113 and feed-gate actuator 112, which are used to limit the height of sand on conveyor belt 116B as the sand leaves hopper 111.

FIG. 3B is a front-end elevation view of input feed hopper assembly 110 with overflow-spillage-prevention wall 111W on the left side to facilitate right-side loading, according to some embodiments of the present invention. The view is from position line 3B marked in FIG. 3C. In some embodiments, hydraulic cylinder 111H (see FIG. 1B) is activated to move spillage-prevention wall 111W between the positions shown in FIG. 3B and FIG. 3E.

FIG. 3C is a side elevation view of input feed hopper assembly 110 having grizzly gate 115 to screen out oversize reject-rocks, and feed gate 113 and feed-gate actuator 112 used to limit the height of sand on conveyor belt 116B as the sand leaves hopper 111, according to some embodiments of the present invention.

FIG. 3D includes front-end elevation views of rotating panel assembly 119 (shown in its two operational positions, left side and right side) used to move overflow-spillage-prevention wall 111W between the left side and right side, according to some embodiments of the present invention. In some embodiments, hydraulic cylinder 1102 is used to push or pull swing arm 1101 and its attached moveable wall 111W to the right side or the left side of the input feed hopper assembly 110.

FIG. 3E is a front-end elevation view of input feed hopper 110 with overflow-spillage-prevention wall 111W on the right side to facilitate left-side loading, according to some embodiments of the present invention. The view is from position line 3E marked in FIG. 3C.

FIG. 4A is a side elevation view of an upper rear portion of trailer-integrated frac-sand conditioning system 100 in the erected operational configuration, with swing-away funnel 133 and rubber boot 134 in their operational configuration (133B) under derrick screener 132, according to some embodiments of the present invention. The highway-travel configuration of funnel 133 and rubber boot 134 is indicated by 133F.

FIG. 4B is a side elevation view of an upper rear portion of trailer-integrated frac-sand conditioning system 100 in the highway-travel configuration, with swing-away funnel 133 and rubber boot 134 in their swung-forward highway-travel configuration, according to some embodiments of the present invention.

FIG. 5 is a flowchart of a trailer-integrated frac-sand set-up and operation method 500, according to some embodiments of the present invention. In some embodiments, the method 500 shown in the flowchart is performed under control of computer system 160 to control set up and operation of trailer-integrated frac-sand conditioning system 100 (see FIG. 1C and FIG. 1E) once system 100 has traveled in its highway-travel configuration (see FIG. 1E) to a well site and positioned relative to the well's frac-mixture equipment (also called frac mixer) 90 or other suitable location specified by the customer who needs the slurry produced by system 100. In other embodiments, parts or all of method 500 are performed by a human user using a checklist to ensure proper procedures are safely performed. In some embodiments, the blocks of the method of flow chart 500 in FIG. 5 perform functions, operations, and tests in the sequential order indicated by the blocks and arrows indicated and are performed and/or controlled by a programmed computer system under the supervision and control of a human user. In some such embodiments, the operations indicated are performed by actuators directly controlled by the computer system, while in other embodiments, the computer system elicits or directs a human to perform certain tasks and to check various conditions and then the computer system 160 receives indications from the human user that the tasks were completed and the checks were verified. In some embodiments, various tests and system adjustments are periodically repeated using sensors and corrective actuators during the operation of system 100. In some embodiments, one or more of the function blocks are omitted or are replaced by alternative functions to accomplish the overall method.

In some embodiments, method 500 includes function block 510 that controls or initiates driving a ground rod 151 into earth ground as an initial operation, in order that system 100 is sufficiently grounded electrically, for safety and electrical-reliability reasons, for the other functions of method 500 to proceed and continue. In some embodiments, block 510 also elicits and receives a signal from one or more sensors (not shown) that detect whether ground rod 151 has been driven sufficiently deep into the earth and/or whether there is a sufficiently small electrical resistance between the metal portions of system 100 and earth ground 88. At decision block 512, the sensed "grounded" signal(s) that indicate(s) sufficient depth of ground rod 151 and/or sufficient electrical conductivity to earth determine either taking control path 514 to pass control back to repeat some or all of block 510, if electrical ground to earth is insufficient, or control path 516 to pass control onward to function block 520. In some embodiments, function block 520 elicits and receives one or more commands from a human user, or otherwise elicits and receives data and, based on the commands/data, determines conditions have been satisfied to start the electrical-generator system 150 and on-trailer portions 161 of electrical-control/computer system 160. In some embodiments, control then passes to function block 522 that performs a power-on self-test (POST) of computer system 160 to verify certain aspects of safety and functionality. In some embodiments, control then passes to function block 530 that elicits and receives one or more commands from a human user, or otherwise elicits and receives data indicating a need to level the trailer of system 100.

In some embodiments, control then passes to function block 532 that, based on the commands and/or sensed data from function block 530, activates the hydraulics for different ones of hydraulic cylinders 1493 (see FIG. 1J and FIG. 1M) to extend or retract the different ones of hydraulic cylinders 1493 to lower or raise each stabilizing foot 1491 end attached to its respective pillar 1492, and receives tilt data from one or more X-Y-Z tilt sensors 1444 (also known as inclinometers, that measure the tilt, angle, or slope of an object based on gravity, and typically use accelerometers to detect angular deviation from a reference angle, which is based on gravity; see FIG. 1K), as are well-known in the art. In some embodiments, one or more of X-Y-Z tilt sensors 1444 are located on each of a plurality of trailer frame members 141. At decision block 534, the sensed "tilt" signals that indicate angle of tilt and/or twist of trailer frame 141 determine either taking control path 536 to pass control back to repeat some or all of block 532 or, once the plurality of tilt sensors indicate that the trailer frame 141 is sufficiently level and not twisted, then taking control path 538 to pass control onward to function block 540. Note, that due to the large weight of the different parts of system 100, in some embodiments, trailer frame 141 may require a sensor on each of a large number of frame members (and optionally additional spaced-apart hydraulic cylinders 1493 attached to each additional optional foot 1491) in order to get the entire frame 141 level.

In some embodiments, control then passes to function block 540 to elicit and receive commands to partially elevate the second conveyor 120, run the hydraulic system to the lift cylinders 144 part way up, and the human user checks and/or uses sensed elevator-angle data from one or more X-Y-Z tilt sensors 1244, to indicate that the second conveyor 120 is sufficiently high so as to allow the funnel 133 to swing around to its fully-back position from its forward travel position (as described just below in function block 541) while clearing the ground, but not so high as to perhaps require a person climbing onto the machinery (i.e., to avoid a human worker being more than about six feet from ground 88 to secure the funnel, if that is needed).

In some embodiments, function block 541 activates hydraulics that swing funnel 133 backward and down, into its operational position relative to the rest of sand-and-water blender-sifter-funnel-boot subsystem 130, and senses whether funnel 133 is locked into its operational position relative to the rest of sand-and-water blender-sifter-funnel-boot subsystem 130. At decision block 542, the sensed "locked" signals indicate whether funnel 133 is in its correct operational position and, if not, determine taking control path 543 to pass control back to repeat some or all of block 541, or, if funnel 133 is correctly locked into its operational position, then taking control path 544 to pass control onward to function block 545.

In some embodiments, function block 545 activates hydraulics to operate the lift cylinders 144 to continue to fully raise the second conveyor 120 to its fully elevated position and sense whether the conveyor is fully elevated, and/or receives tilt data from the one or more X-Y-Z angle sensors 1244 and/or pin-lock sensors 1484 and/or one or more height-extension sensors 1245 that sense whether elevator 120 has been elevated to a sufficient height (some embodiments sense height on both the left and right sides of elevator 120, and based on each height value, apply hydraulic fluid to the appropriate left-hand or right-hand lift cylinder 144).

At decision block 546, if the sensed "elevation" signals that indicate angle or height of elevation of second conveyor 120 is not sufficient (i.e., conveyor 120 is not fully elevated), then pass control on path 547 back to block 545 to continue the lifting operation, else pass control on path 548 to block 550.

In some embodiments, function block 550, based on the sensed elevation height and/or angle data, activates the hydraulics for each one of the lock-pin hydraulic cylinders 148H to insert the associated ones of lock pins 148P, and to sense whether each lock pin 148P is fully inserted in its through-hole 148TO through its associated members 146 and 147. At decision block 551, check the sensed "locked" signals that indicate whether every lock pin 148P is sufficiently inserted; and if every lock pin 148P is not sufficiently inserted, then taking control path 552 to pass control back to repeat some or all of block 550, or else, once the plurality of lock pin sensors 1484 indicate all lock pins 148P are sufficiently seated and locked, taking control path 553 to pass control onward to function block 554.

In some embodiments, function block 560 elicits and receives commands to start the second conveyor belt 120B of second conveyor 120, and function block 562 that, based on the received commands and/or sensed data, activates the motor(s) for the second conveyor belt 120B, and receives belt-motion data and belt-weight data from one or more motion sensors 1264 and/or one or more weight sensors 128 that sense whether second conveyor belt 120B is moving properly to receive sand from first conveyor belt 116B and/or what amount of sand per unit of time is being conveyed. At decision block 564, the sensed "second-belt-motion" signal(s) that indicate whether second conveyor belt 120B is sufficiently moving to receive sand, and, if not, then taking control path 566 to pass control back to repeat some or all of block 562 or, once second conveyor belt 120B is sufficiently moving, then taking control path 568 to pass control onward to function block 570.

In some embodiments, function block 570 elicits and receives commands to start the first conveyor belt 116B of input hopper system 110, and then function block 572, based on the received commands and/or sensed data, activates the water valve(s) 167 and water meter(s) 168 to get water going into sand-and-water blender 131 and sense the amount of water per unit of time. In some embodiments, function block 572 also activates the motor(s) for the first conveyor belt 116B, and receives belt-motion data from one or more motion sensors 1164 that sense whether first conveyor belt 116B is moving properly to receive sand from hopper 111 and/or the weight (amount) of sand per unit of time is being conveyed by second conveyor 120. At decision block 574, the sensed signal(s) "water flow amount," "first-belt-motion," and/or "sand-weight-amount-per-unit-of-time on second conveyor 120B (from sensor 128)" that indicate whether second conveyor belt 120B and first conveyor belt 116B are both sufficiently moving to receive sand, and, if not, then taking control path 576 to pass control back to repeat some or all of block 572 or, once first conveyor belt 116B and (by inference from block 564 or continued sensing) second conveyor belt 120B are sufficiently moving (and optionally that water is flowing), then taking control path 578 to pass control onward to function block 580. In some embodiments, the sensing of water flow of function block 572 and the decisions based on water flow of decision block 574 are instead or in addition moved to function block 580 and decision block 582.

In some embodiments, function block 580 receives sensed data indicating sand has been deposited in input hopper system 110, sensed data that indicates the amount (weight) of sand per unit of time, and/or sensed data that indicates the amount of water per unit of time. At decision block 582, if the sensed "water flow amount" is insufficient, then control is passed to function block 592 which, based on the received commands and/or sensed data, activates the water valve(s) 167 and water meter(s) 168 and/or signals to the customer's external water pump to get water going and signals to the human operator of the front-end loader (or, in other embodiments, to robotically controlled machinery) to stop loading sand into input hopper 110, else control passes via path 584 to decision block 586 to test whether the sand weight on second conveyor belt 120B is low and/or the sand height in hopper 111 is low, and if so then control passes by path 589 to function block 590.

In some embodiments, function block 590 signals to the human operator of the front-end loader (or, in other embodiments, to robotically controlled machinery) to start loading more sand into input hopper 110, and control passes via path 594 to reiterate block 580, which includes detecting the amount of sand put into or remaining in input hopper 111

In some embodiments, the various tests, sensed signals, decision blocks and functional blocks of method 500 are repeatedly and iteratively performed to tune and refine the operations of system 100. In some embodiments, sensed signals and human-user inputs from the customer's equipment and/or personnel are elicited by control system 160 (or on-trailer control system 160'), and the received commands, signals and/or data are used to control first conveyor belt 116B (i.e., to turn off first conveyor belt 116B to stop sand-slurry delivery), and/or to control the height of knife-edge gate 113 via electric gate actuator 112 to control the rate of sand onto second conveyor belt 120B and thus the sand content per unit of time of the delivered slurry dropping out through boot 134 to the customer's frac mixer (also called frac-mixture equipment) 90.

In some embodiments, function block 599 is continually and/or periodically performed to continually collect, save, and/or transmit data as to: sand delivered, operational parameters and faults of the machinery of system 100, the geographical location of system 100, when operated and the number of hours operated, how much diesel fuel was used by the generator set (thus when a refill might be needed), who were the person(s) operating and/or inspecting system 100, faults including emergency-stop conditions (ESC's), wear, and other data of interest. If any ESC is detected (such as a human pressing an ESC button or lack of continuous (or periodic within a predetermined repeating amount of time) reception of an "Okay to Continue Operations" (also called a "Fail-Safe") signal), then stop all machinery, motors, automated processes and the like. In some embodiments, even if automated processes are disabled (such as after an emergency-stop button was pressed), system 100 will continue to be operable by a human operator using manual controls. In some embodiments, the data collected by function block 599 is used to charge money (e.g., rental fees for use of system 100), or provide discounts or credits to the customer based on time that system 100 was not operational due to repairs or other circumstances.

In some embodiments, the present invention provides a non-transitory computer-readable storage medium having stored thereon executable instructions that, when executed by a processor, cause the processor to perform some or all of method 500.

FIG. 6A is a block diagram 601 of a distributed control system 160 (including on-trailer portion 161 and off-trailer portion 162) for executing a trailer-integrated frac-sand conditioning set-up method 500, according to some embodiments of the present invention. In some embodiments, off-trailer portion 162 is implemented in a tablet computer (such as an iPad) operated by a human user at a short distance from system 100 (such as in a pickup truck parked nearby to shelter the user from the weather, while allowing close observation and supervision of the job site by the human, as well as providing human monitoring and control of the erection and operation of system 100 by method 500). In some embodiments, the off-trailer portion 162 includes a plurality of separate elements, such as one or more elements that output audio, visual, haptic or other signals to humans, and other elements such as a headset worn by the human operator of the front-end loader, or an on-tractor console on a front-end loader, to communicate indications that more sand should now or soon be loaded into input hopper system 110, or different-color or different-location lights on the input hopper to indicate to load or stop loading such sand. In some embodiments, on-trailer portion 161 and off-trailer portion 162 communicate with each other via two-way radio signals, such as WiFix or Bluetooth™. In some embodiments, a portion 500.1 of set-up method 500 is performed in on-trailer computer system 161 and another portion 500.2 of method 500 is performed in off-trailer computer system 162. Conversely, in some embodiments, a portion 700.1 of the later-executed take-down method 700 (discussed below concerning FIG. 7) is performed in on-trailer computer system 161 and another portion 700.2 of take-down method 700 is performed in off-trailer computer system 162. In some embodiments, a non-transitory computer-readable storage medium 611 has stored thereon executable instructions that, when executed by a processor, cause the processor to perform some or all of method portions 500.1 and/or 700.1. In some embodiments, a non-transitory computer-readable storage medium 612 has stored thereon executable instructions that, when executed by a processor, cause the processor to perform some or all of method portions 500.2 and/or 700.2.

FIG. 6B is a block diagram 602 of an all-on-trailer control system 160' for executing a trailer-integrated frac-sand conditioning set-up method 500, according to some embodiments of the present invention. In some such embodiments, an input/output console of control system 160' provides an on-trailer interface for a human user to monitor and/or control method 500. Conversely, in some embodiments, the later-executed take-down method 700 is performed in all-on-trailer control system 160'. In some embodiments, a non-transitory computer-readable storage medium 610 has stored thereon executable instructions that, when executed by a processor, cause the processor to perform some or all of methods 500 and/or 700.

FIG. 7 is a flow chart of a trailer-integrated frac-sand funnel swing up, de-erection and highway-travel ("take-down") method 700, according to some embodiments of the present invention. In some embodiments, take-down method 700 shown in the flowchart is performed under control of computer system 160 to control emptying system 100 of any remaining sand, de-erecting (taking down) trailer-integrated frac-sand conditioning system 100 (changing from the configuration of FIG. 1C to the configuration of FIG. 1E) once system 100 has completed its operating mission. In other embodiments, parts or all of method 700 are performed by a human user using a checklist to ensure proper procedures are safely performed. In some embodiments, the blocks of the flowchart of method 700 perform functions, operations, and tests in the sequential order indicated by the blocks and arrows indicated and are performed and/or controlled by a programmed computer system 160 under the supervision and control of a human user. In some such embodiments, the operations indicated are performed by actuators directly controlled by the computer system 160, while in other embodiments the computer system 160 elicits or directs a human to perform certain tasks and to check various conditions and then the computer system 160 receives indications from the human user that the tasks were completed and that checks were verified. In some embodiments, various tests and system adjustments are periodically repeated using sensors and corrective actuators during the de-erection of system 100. In some embodiments, one or more of the function blocks of take-down method 700 are omitted or are replaced by alternative functions to accomplish the overall method 700.

In some embodiments, method 700 includes function block 710 that elicits and receives commands or confirmation to end operations and prepare to leave, and signals the operator of the front-end loader to stop loading sand into input hopper 111, as well as detecting the amount of sand remaining in input hopper 111. At decision block 712, if input hopper 111 is not yet sufficiently empty, control passes along path 714 back to block 710; else, if input hopper 111 is sufficiently empty, control passes along path 716 block 720. Blocks 710, 712, 714, and 716 help ensure the input hopper 111 is emptied before stopping other processes (such as stopping the first conveyor belt) that are needed to empty the input hopper 111. Function block 720 elicits and receives commands or confirmation to stop first conveyor belt 116B, and function block 722 stops first conveyor belt 116B so that no more sand is deposited onto second conveyor belt 120B, and senses whether first conveyor belt 116B is stopped. At decision block 724, if first conveyor belt 116B is not yet stopped, control passes along path 726 back to block 722; else, if first conveyor belt 116B is stopped, control passes along path 728 block 730. Blocks 720, 722, 724, 726 and 728 help ensure the first conveyor belt is stopped so no more sand is deposited on the second conveyor 120B before stopping other processes (such as stopping the second conveyor belt) that are needed to clear sand from apparatus 100. Function block 730 elicits and receives commands or confirmation to stop second conveyor belt 120B, then control passes to function block 731 which checks/senses that the sand on the second conveyor has been emptied, wherein the check is either optically (by a camera or other optical sensor), visually (by a human worker) or by weight (e.g., using weight sensor 128 (see FIG. 1L)). At decision block 732, if second conveyor belt 120B is not yet empty, control passes along path 733 back to block 731; else, if second conveyor belt 120B is empty, control passes along path 734 to block 735.

Function block 735 tries to stop the second conveyor belt 120B and checks/senses whether the second conveyor 120B has stopped, wherein the check is either optically (by a camera or other optical sensor), visually (by a human worker) or by belt-motion data (in some embodiments, data that was generated from one or more motion sensors 1264 (see FIG. 1L)). At decision block 736, if second conveyor belt 120B is not yet stopped, control passes along path 737 back to block 735; else, if second conveyor belt 120B is stopped, control passes along path 738 to block 740.

Function block 740 stops the sifter 132 so that no more sand is deposited into funnel 133, and stops the water flow. Function block 742 runs the hydraulics to pull the lock pins 148P and senses (e.g., in some embodiments, via data from lock pin sensors 1484) whether the lock pins 148P are pulled. At decision block 744, if the lock pins 148P are not pulled, control passes along path 746 back to block 742; else control passes along path 748 to block 750.

In order to allow a worker to operate mechanisms that facilitate swinging the funnel forward without climbing on the machinery, block 750 elicits and receives commands to partially lower the second conveyor 120. Block 752 "runs" or operates the hydraulics (e.g., in some embodiments, by operating the lift cylinders 144 to an approximately half-way-down position that allows a human worker access locks or other parts no more than six feet from ground level). At decision block 754, if the second conveyor 120 is moved to approximately half-way-down position, control passes along path 756 back to block 752; else control passes along path 758 to block 760.

Function block 760 runs the hydraulics to swing funnel 133 forward and to lock funnel 133 in its forward highway-travel configuration and senses whether funnel 133 is locked in its forward highway-travel configuration. At decision block 761, if funnel 133 is not locked in its forward highway-travel configuration, control passes along path 762 back to block 760; else, if funnel 133 is locked in its forward highway-travel configuration, control passes along path 763 to block 764.

Function block 764 "runs" or operates the hydraulics (e.g., in some embodiments, by operating the lift cylinders 144) to lower the second conveyor 120 to an all-the-way-down position, and sense whether the second conveyor 120 is fully lowered. At decision block 765, if the second conveyor 120 is not yet moved to the all-the-way-down position, control passes along path 766 back to block 764; else control passes along path 768 to block 770.

Function block 770 runs the hydraulics to raise the leveling cylinders 1493, and senses whether the leveling cylinders ("levelers") 1493 are raised to their highway-travel configuration. At decision block 772, if the leveling cylinders 1493 are not fully raised, then control passes along path 774 back to block 770; else control passes along path 776 block 780. In some embodiments, function block 770 powers down the hydraulic system 143, powers down the electrical alternators 153 and/or 154 and provides the indication to disconnect the external water supply at connection 166. Then, at function block 790, ground rod 151 is pulled from earth ground, and a signal from one or more sensors detects whether ground rod 151 is fully pulled and positioned in its highway-travel configuration. At decision block 792, if ground rod 151 is not fully pulled then control passes along path 794 back to block 790; else control passes along path 796 to block 799 that indicates the highway-travel configuration is ready.

In some embodiments, the present invention provides a non-transitory computer-readable storage medium having stored thereon executable instructions that, when executed by a processor, cause the processor to perform some or all of method 700.

In some embodiments, the present invention provides a self-contained sand-conveyor system 100 operable to be set up into an erected operable configuration and to be reconfigured into a lowered highway-travel configuration. This system 100 includes: a single trailer 140 suitable for highway travel, wherein onto the trailer are mounted and pre-assembled: an input feed hopper 111 configured for receiving side-loaded sand;
  a first conveyor assembly 116;
  a second conveyor assembly 120;
  a sand-liquid blender 131 for mixing a liquid containing water with the sand to form
  a frac-sand slurry, wherein the first conveyor assembly extends from the hopper to transfer sand onto the second conveyor assembly, wherein the second conveyor assembly is configured to transport sand to the fluid-sand blender;
  a vibratory sifter 132 located below the sand-liquid blender 131 for removing debris from the frac-sand slurry to form sifted frac-sand slurry;
  a discharge funnel 133 that is positioned or positionable to a location below the vibratory sifter 132 to receive sifted frac-sand slurry from the vibratory sifter, wherein the funnel terminates in a discharge boot to control discharge of the sifted frac-sand slurry;
  an electrical-generator set 150 for powering the system; and
  elevation actuators and height-maintenance locks for the erection rigging of the system, eliminating the need for workers to climb on the equipment and use safety harnesses.

In some embodiments of the sand-conveyor system, the input feed hopper is configurable for receiving sand from a front-end loader on either a left side or a right side of the trailer.

In some embodiments of the sand-conveyor system, the input feed hopper includes a movable wall associated with the hopper to prevent sand spillage on the opposite side during loading, wherein the movable wall is configurable for side-loading sand from either a left side or a right side of the trailer by a front-end loader.

In some embodiments of the sand-conveyor system, the first conveyor is configured as a belt conveyor.

In some embodiments of the sand-conveyor system, the first conveyor is configured as a screw-auger conveyor.

In some embodiments of the sand-conveyor system, the second conveyor is configured as a belt conveyor.

In some embodiments of the sand-conveyor system, the second conveyor is configured as a screw-auger conveyor.

In some embodiments of the sand-conveyor system, the discharge funnel is configured to be rotated around a funnel-rotation axis between an operational position below the vibratory sifter and a more compact highway-travel position between a frame of the trailer and the second conveyor.

In some embodiments of the sand-conveyor system, the discharge funnel is made of sheet metal and the discharge boot is made of rubber or a rubber-like material, and wherein the rubber boot reduces slurry droplets and spillage during sifted frac-sand slurry discharge.

Some embodiments of the sand-conveyor system further include OSHA-compliant nighttime safety lighting connected to pre-wired electrical conductors enclosed in metal conduit, requiring no on-site electrical connections.

Some embodiments of the sand-conveyor system further include one or more OSHA-compliant stairways and inspection platforms with safety railings and toe boards that are affixed to the system to require no on-site manual assembly to achieve the operational configuration.

In some embodiments of the sand-conveyor system, the input feed hopper includes a movable wall associated with the hopper to prevent sand spillage on the opposite side during loading, wherein a position of the movable wall associated with the hopper is hydraulically adjustable. In other embodiments of the sand-conveyor system, a position of the movable wall associated with the hopper is manually adjustable.

Some embodiments of the sand-conveyor system further include a hydraulic system that includes: one or more hydraulic pumps, one or more hydraulic conduits and hydraulic valves, one or more hydraulic lift cylinders, operably connected to the one or more hydraulic pumps via the one or more hydraulic conduits and hydraulic valves, for lifting the second conveyor, the sand-liquid blender, and the vibratory sifter to their respective operational positions, and one or more hydraulic pin-lock assemblies connected to the one or more hydraulic pumps via the one or more hydraulic conduits and hydraulic valves, that are operable to lock the second conveyor, the sand-liquid blender, and the vibratory sifter at their respective operational positions. In some such embodiments, the generator set provides electrical power for all mechanical operations and safety features, as well as for electrical motors driving the hydraulic pumps of the hydraulic system.

In some embodiments of the sand-conveyor system, the generator set includes a primary alternator and a backup alternator.

In some embodiments of the sand-conveyor system, the system is designed for quick erection to an operational configuration and quick take down to a compact highway-travel configuration, to facilitate worker safety, transportability and deployment.

Some embodiments of the sand-conveyor system further include a computer operably coupled to the hydraulic system and configured to elicit and receive commands from a human user, and based on the received commands, control operation of the hydraulic valves to erect the second conveyor, the sand-liquid blender, and the vibratory sifter to their respective operational positions and to lock the second conveyor, the sand-liquid blender, and the vibratory sifter at their respective operational positions.

Some embodiments of the sand-conveyor system further include one or more liquid valves and one or more liquid meters; and a computer operably coupled to the one or more liquid valves and one or more liquid meters and configured to elicit and receive commands from a human user, and based on the received commands, control operation of the sand-liquid blender for mixing a liquid containing water with the sand to form a frac-sand slurry, and control operation of the vibratory sifter.

In some embodiments, the present invention provides a method that includes: providing a system 100 with a trailer assembly 140, the trailer assembly 140 having mounted thereon an input hopper assembly 110, a first conveyor assembly 116 that includes a first belt conveyor 116B, a second conveyor assembly 120 that includes a second conveyor belt 120B, a sand-and-water blender-sifter-funnel-boot subsystem 130, a hydraulic system 143, and an electrical generator set 150; activating erection actuators using the hydraulic system 143 to raise the second conveyor assembly 120 and the sand-and-water blender-sifter-funnel-boot subsystem 130 to an erected operational configuration, activating height-maintaining locks 148 to keep the second conveyor assembly 120 and the sand-and-water blender-sifter-funnel-boot subsystem 130 in the operational configuration; operating the electrical generator set 150 to provide electrical power to control the first conveyor assembly 116 and the second conveyor assembly 120. Some such embodiments further include providing a ground rod 151 and associated hydraulic cylinder 152 for electrical system wiring powered by electrical generator set 150, wherein the method includes automatically driving the ground rod 151 a suitable distance down into the earth ground using hydraulic cylinder 152 as a first step during set up such that the entire system 100 is grounded to earth ground during all set-up and operational phases, providing electrical contact to earth ground for electrical-system safety, and upon completion of operations at a wellsite, lowering the system 100 to its highway-travel compact configuration, and after all other steps, as a last step, pulling the ground rod 151 from the earth using hydraulic cylinder 152 so that system 100 is grounded for its entire stay at the wellsite.

In some embodiments of the method, the self-contained trailer system further includes an electrical motor and a hydraulic pump, and wherein the plurality of elevation actuators includes hydraulic cylinders, and wherein the method further includes powering the hydraulic pump using the electrical motor.

In some embodiments of the method, the generator set includes a primary alternator and a backup alternator, and wherein the method further includes detecting a condition indicative of a failure or impending failure of the primary alternator, and based on the detected condition, activating the backup alternator to power the self-contained trailer system.

In some embodiments, the present invention provides a system that includes:
- a trailer assembly 140 having mounted thereon an input hopper assembly 110, a first conveyor assembly 116, a second conveyor assembly 120, a sand-and-water blender-sifter-funnel-boot subsystem 130, a hydraulic system 143, erection actuators 144, and an electrical generator set 150;
- a computer 160 that performs a method 500, and that is controlled by a user, and wherein the computer is connected to a non-transitory storage medium having instructions stored thereon for executing the method, wherein the method includes:
  a. activating the erection actuators 144 using the hydraulic system 143 to raise the second conveyor assembly 120 and the sand-and-water blender-sifter-funnel-boot subsystem 130 to an erected operational configuration,
  b. activating height-maintaining locks 148 to keep the second conveyor assembly 120 and the sand-and-water blender-sifter-funnel-boot subsystem 130 in the operational configuration; and
  c. operating the electrical generator set 150 to provide electrical power to controllers that control the first conveyor assembly 116 and the second conveyor assembly 120.

In some embodiments, the present invention provides a non-transitory storage medium having instructions stored thereon for executing a method 500 associated with a self-contained system 100 that includes: a trailer-frame assembly 140 having mounted thereon an input hopper assembly 110, a first conveyor assembly 116, a second conveyor assembly 120, a sand-and-water blender-sifter-funnel-boot subsystem 130, a hydraulic system 143, erection actuators 144, and an electrical generator set 150; and a computer 160 that performs the method 500, and wherein the computer 160 is operably connected to the non-transitory storage medium, wherein the method 500 includes:
- activating the erection actuators 144 using the hydraulic system 143 to raise the second conveyor assembly 120 and the sand-and-water blender-sifter-funnel-boot subsystem 130 to an erected operational configuration,
- activating height-maintaining locks 148 to keep the second conveyor assembly 120 and the sand-and-water blender-sifter-funnel-boot subsystem 130 in the operational configuration; and
- operating the electrical generator set 150 to provide electrical power to controllers that control the first conveyor assembly 116 and the second conveyor assembly 120.

Some embodiments further include a height-lock assembly for changing between operational and highway-travel configurations.

The height-lock invention relates to structural locking mechanisms, and more particularly, to a hydraulically operated height-lock assembly configured to safely secure a structural system in a rigid elevated operational configuration and allow for its later reconfiguration into a compact highway-travel configuration. The height-lock invention provides a height-lock assembly that uses a hydraulic mechanism to secure and release structural elements for reconfiguration. The height-lock assembly ensures robust locking for stability during operational use and quick release, without workers climbing on the equipment, for compact reconfiguration during transport.

Referring to FIG. 1P2 and FIG. 1Q, in some embodiments, a height-lock assembly 148 is provided as part of a system 100. The height-lock assembly 148 secures system 100 in its rigid elevated operational configuration and facilitates its subsequent transition to a highway-travel configuration.

In some embodiments, each height-lock assembly 148 includes a hydraulic cylinder 148H, a pivot lever 148L, a lock pin 148P, and through-openings 146TO (which are designated 148TO when in the system is in its final erected position) near the tops of the lower one or more vertical support structures 146, each vertical support structure 146 including outer beam portion 1462 and parallel inner beam portion 1463, on each of side of, or concentrically surrounding, upper moveable beam 147, which near its bottom has through-opening 147TO (which is designated 148TO when the system is in its final erected position). In some embodiments, the hydraulic cylinder 148H, is operable in two modes:

Locking Mode: The hydraulic cylinder 148H pulls on the pivot lever 148L. This action pushes the lock pin 148P into the through-openings 148TO when the system is in its erected operational configuration. These openings pass through beams of vertical support structure 146, which surround moveable upper beams 147 (which have their own through-openings 148TO), effectively locking the system 100 in its erected operational configuration.

Reconfiguration Mode: The hydraulic cylinder 148H pushes on the pivot lever 148L. This action pulls the lock pin 148P out from the through-openings 148TO, allowing the system 100 to transition into its compact highway-travel configuration.

In some embodiments, to enhance the rigidity of the structure, the lower brace structure 146 includes a plurality of brace beams 1461 and 1466. In some embodiments, these brace beams 1461 and 1466 are welded to the bracing structure 146, creating a rigid framework that ensures the stability and durability of the system in its operational configuration.

In some embodiments, the present invention provides a sand-conveyor method. The method uses a self-contained trailer system operable to be set up into an erected operational configuration and to be reconfigured into a compact highway-travel configuration, wherein the trailer system includes a single trailer suitable for highway travel, wherein on the trailer are mounted and pre-assembled: an input feed hopper, a first conveyor assembly, a second conveyor assembly, a sand-liquid blender, a vibratory sifter located below the sand-liquid blender, a discharge funnel that is positionable to a location below the vibratory sifter to receive sifted frac-sand slurry from the vibratory sifter, a generator set for powering the system, and a plurality of elevation actuators and a plurality of height-maintenance locks. In some embodiments, the method includes: leveling a frame of the single trailer; elevating an end of the second conveyor to an operational angle using one or more of the plurality of elevation actuators; locking the second conveyor at its operational angle using one or more of the plurality of height-maintenance locks; swinging the discharge funnel from its highway-travel configuration to its operational configuration; using the first conveyor assembly to convey sand from the input hopper to the second conveyor assembly; using the second conveyor assembly to convey its sand to a higher elevation and drop the sand into the sand-liquid blender; using the sand-liquid blender to mix a liquid containing water with the sand to form a frac-sand slurry; sifting the frac-sand slurry using the vibratory sifter to form a sifted frac-sand slurry; and dropping the sifted frac-sand slurry into the discharge funnel.

In some embodiments, the present invention provides a self-contained sand-conveyor apparatus operable to be set up into an erected operational configuration and to be reconfigured into a highway-travel configuration. This apparatus includes: a single trailer suitable highway travel, wherein on the trailer are mounted and pre-assembled: an input hopper, a first conveyor, a second conveyor, a sand-liquid blender, a vibratory sifter located below the sand-liquid blender, a discharge funnel that is positionable to a location below the vibratory sifter to receive sifted frac-sand slurry from the vibratory sifter; means, mounted to the single trailer, for providing electricity to the apparatus; means, mounted to the single trailer, for leveling a frame of the single trailer; means, mounted to the single trailer, for elevating an end of the second conveyor to an operational angle using one or more of the plurality of elevation actuators; means, mounted to the single trailer, for locking the second conveyor at its operational angle using one or more of the plurality of height-maintenance locks; means, mounted to the single trailer, for swinging the discharge funnel from its highway-travel configuration to its operational configuration, wherein the first conveyor conveys sand from the input hopper to the second conveyor, wherein the second conveyor conveys sand received from the first conveyor to a higher elevation and drops the sand into the sand-liquid blender that mixes a liquid containing water with the sand to form a frac-sand slurry; means, mounted to the single trailer, for sifting the frac-sand slurry including the vibratory sifter; and means, mounted to the single trailer, for funneling the sifted frac-sand slurry downward into a customer's hydraulic fracturing pumping equipment, wherein the means for funneling includes the discharge funnel.

In some embodiments, the present invention provides a self-contained sand-conveyor apparatus operable to be set up into an erected operational configuration and to be reconfigured into a highway-travel configuration. This apparatus includes a single trailer suitable highway travel, wherein on the trailer are mounted and pre-assembled: an input feed hopper, a first conveyor, a second conveyor, a sand-liquid blender; means, mounted to the single trailer, for providing electricity to the apparatus; means, mounted to the single trailer, for leveling a frame of the single trailer; means, mounted to the single trailer, for elevating an end of the second conveyor to an operational angle; means, mounted to the single trailer, for locking the second conveyor at its operational angle, wherein the first conveyor conveys sand from the input hopper to the second conveyor, wherein the second conveyor conveys sand received from the first conveyor to a higher elevation and drops the sand into the sand-liquid blender that mixes a liquid containing water with the sand to form a frac-sand slurry; means, mounted to the single trailer, for sifting the frac-sand slurry to form sifted frac-sand slurry; means, mounted to the single trailer, for funneling the sifted frac-sand slurry downward into a customer's hydraulic fracturing pumping equipment; and means, mounted to the single trailer, for swinging the means for funneling from its highway-travel configuration to its operational configuration.

In some embodiments, the present invention provides a non-transitory computer-readable storage medium storing one or more programs configured to be executed by one or more processors of a self-contained trailer system that includes a single trailer suitable for highway travel, wherein on the trailer are mounted and pre-assembled: an input hopper, a first conveyor, a second conveyor, a sand-liquid blender, a vibratory sifter located below the sand-liquid blender, a discharge funnel that is positionable to a location below the vibratory sifter to receive sifted frac-sand slurry from the vibratory sifter, an electrical generator set for powering the system, and a plurality of elevation actuators and a plurality of height-maintenance locks, the one or more programs including instructions for: leveling a frame of the single trailer; elevating an end of the second conveyor to an operational angle using one or more of a plurality of elevation actuators; locking the second conveyor at its operational angle using one or more of a plurality of height-maintenance locks; swinging the discharge funnel from its highway-travel configuration to its operational configuration; using the first conveyor to convey sand from the input hopper to the second conveyor; using the second conveyor to convey its sand to a higher elevation and drop the sand into the sand-liquid blender; using the sand-liquid blender to mix a liquid containing water with the sand to form a frac-sand slurry; sifting the frac-sand slurry using the vibratory sifter to form sifted frac-sand slurry; and passing the sifted frac-sand slurry into the discharge funnel.

In some embodiments, the present invention provides a height-lock assembly for securing a structural system in an operational configuration and subsequently enabling its transition to a highway-travel configuration. The height-lock assembly includes: a hydraulic cylinder configured to implement a locked mode during system operation and reconfigure into an unlocked mode for changing to a highway-transport configuration; a pivot lever operatively connected to the hydraulic cylinder; a lock pin actuated by the pivot lever to engage or disengage with through-openings in surrounding structural beams; and a lower brace structure including beams with through-openings, wherein the lock pin engages with the through-openings to secure (lock) the system in the operational configuration.

In some embodiments of the height-lock assembly, the hydraulic cylinder pulls the pivot lever to push the lock pin into the through-openings in the locking mode.

In some embodiments of the height-lock assembly, the hydraulic cylinder pushes the pivot lever to pull the lock pin out of the through-openings in the reconfiguration mode to transition to a highway-travel configuration.

Some embodiments of the height-lock assembly further include a plurality of brace beams welded to the lower brace structure to enhance its rigidity.

An overview of the height-lock assembly includes a hydraulic cylinder, a pivot lever, and a lock pin configured to secure and release a structural system. The assembly enables secure locking in an operational configuration and allows reconfiguration for highway transport. In some embodiments, the assembly further includes welded brace beams to ensure structural rigidity.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A trailer-integrated sand-conveyor system operable to be set up into an erected operable configuration and to be reconfigured into a highway-travel configuration, the system comprising:
   a single trailer suitable for highway travel, wherein on the trailer are mounted and pre-assembled:
      an input hopper configured for receiving side-loaded sand;
      a first conveyor;
      a second conveyor;
      a sand-liquid blender for mixing a liquid that includes water with the sand to form a frac-sand slurry, wherein the first conveyor extends from the input hopper to transfer sand onto the second conveyor, wherein the second conveyor is configured to transport the sand to the fluid-sand blender;
      a vibratory sifter located below the sand-liquid blender for removing debris from the frac-sand slurry to form sifted frac-sand slurry;
      a discharge funnel that is positioned or positionable to a location below the vibratory sifter to receive sifted frac-sand slurry from the vibratory sifter, wherein the discharge funnel directs discharge of the sifted frac-sand slurry;
      an electrical-generator set that generates electrical power for the system; and
      elevation actuators and height-maintenance locks for erection rigging the system.

2. The sand-conveyor system of claim 1, wherein the input hopper is configured for receiving side-loaded sand from either a left side or a right side of the trailer by a front-end loader, and wherein the input hopper includes a movable wall associated with the hopper to prevent sand spillage on the opposite side during loading, wherein the movable wall is configurable to prevent sand spillage when sand is side-loaded from either a left side or a right side of the trailer by a front-end loader.

3. The sand-conveyor system of claim 2, wherein a position of the movable wall associated with the input hopper is hydraulically adjustable.

4. The sand-conveyor system of claim 1, wherein the first conveyor is configured as a belt conveyor and wherein the second conveyor is configured as a belt conveyor.

5. The sand-conveyor system of claim 1, wherein the electrical-generator set generates alternating current (AC) power.

6. The sand-conveyor system of claim 1, further comprising:
   a hydraulic pump that is powered by an electrical motor powered by the electrical power from the electrical-generator set.

7. The sand-conveyor system of claim 1, further comprising:
   a hydraulic system powered by the electrical power from the electrical-generator set configured to operate the elevation actuators and height-maintenance locks.

8. The sand-conveyor system of claim 1, further comprising a hydraulic system that includes:
   one or more hydraulic pumps,
   one or more hydraulic conduits and hydraulic valves, one or more hydraulic lift cylinders, operably connected to the one or more hydraulic pumps via the one or more hydraulic conduits and hydraulic valves, for lifting the second conveyor, the sand-liquid blender, and the vibratory sifter to their respective operational positions; and one or more hydraulic pin-lock assemblies connected to the one or more hydraulic pumps via the one or more hydraulic conduits and hydraulic valves, that are operable to lock the second conveyor, the sand-liquid blender, and the vibratory sifter at their respective operational positions.

9. The sand-conveyor system of claim 8, wherein the generator set provides electrical power for all mechanical operations and safety features other than those using only power from the hydraulic system.

10. The sand-conveyor system of claim 1, wherein the discharge funnel is configured to be rotated around a funnel-rotation axis between an operational position below the vibratory sifter and a more compact highway-travel position between a frame of the trailer and the second conveyor.

11. The sand-conveyor system of claim 1, wherein the discharge funnel is made of sheet metal and the discharge boot is made of rubber or a rubber-like material, and wherein the rubber boot reduces slurry droplets and spillage during discharge of the sifted frac-sand slurry.

12. The sand-conveyor system of claim 1, further including OSHA-compliant nighttime safety lighting connected to pre-wired electrical conductors enclosed in metal conduit, requiring no on-site electrical connections.

13. The sand-conveyor system of claim 1, further including one or more OSHA-compliant stairways and inspection platforms with safety railings and toe boards that are affixed to the system to require no on-site manual assembly to achieve the operational configuration.

14. The sand-conveyor system of claim 1, wherein the discharge funnel includes a discharge boot to control discharge of the sifted frac-sand slurry.

15. The sand-conveyor system of claim 1, wherein the generator set includes a primary alternator and a backup alternator.

16. The sand-conveyor system of claim 1, further comprising:
one or more liquid valves and one or more liquid meters; and
a computer operably coupled to the one or more liquid valves and one or more liquid meters and configured to elicit and receive commands from a human user, and based on the received commands, control operation of the sand-liquid blender for mixing a liquid that includes water with the sand to form a frac-sand slurry, and control operation of the vibratory sifter.

17. The sand-conveyor system of claim 1, further comprising a computer operably coupled to the hydraulic system and configured to elicit and receive commands from a human user, and based on the received commands, control operation of the hydraulic valves to erect the second conveyor, the sand-liquid blender, and the vibratory sifter to their respective operational positions and to lock positions of the second conveyor, the sand-liquid blender, and the vibratory sifter at their respective operational positions.

18. A sand-conveyor method that uses a self-contained trailer system operable to be set up into an erected operational configuration and to be reconfigured into a highway-travel configuration, wherein the trailer system includes a single trailer suitable for highway travel, wherein on the trailer are mounted and pre-assembled: an input hopper, a first conveyor, a second conveyor, a sand-liquid blender, a vibratory sifter located below the sand-liquid blender, a discharge funnel that is positionable to a location below the vibratory sifter to receive sifted frac-sand slurry from the vibratory sifter, an electrical generator set for powering the system, and a plurality of elevation actuators and a plurality of height-maintenance locks, the method comprising:
leveling a frame of the single trailer;
elevating an end of the second conveyor to an operational angle using one or more of a plurality of elevation actuators;
locking the second conveyor at its operational angle using one or more of a plurality of height-maintenance locks;
swinging the discharge funnel from its highway-travel configuration to its operational configuration; and
using the first conveyor to convey sand from the input hopper to the second conveyor;
using the second conveyor to convey its sand to a higher elevation and drop the sand into the sand-liquid blender;
using the sand-liquid blender to mix a liquid containing water with the sand to form a frac-sand slurry;
sifting the frac-sand slurry using the vibratory sifter to form sifted frac-sand slurry; and
dropping the sifted frac-sand slurry into the discharge funnel.

19. The sand-conveyor method of claim 18, wherein the self-contained trailer system further includes an electrical motor and a hydraulic pump powered by the electrical motor, and wherein the plurality of elevation actuators includes hydraulic cylinders, and wherein the method further includes powering the hydraulic pump using the electrical motor.

20. The sand-conveyor method of claim 18, wherein the generator set includes a primary alternator and a backup alternator, and wherein the method further includes detecting a condition indicative of a failure or impending failure of the primary alternator, and based on the detected condition, activating the backup alternator to power the self-contained trailer system.

21. A self-contained sand-conveyor apparatus operable to be set up into an erected operational configuration and to be reconfigured into a highway-travel configuration, the apparatus comprising:
a single trailer suitable for highway travel, wherein on the trailer are mounted and pre-assembled: an input hopper, a first conveyor, a second conveyor, a sand-liquid blender;
means, mounted to the single trailer, for providing electricity to the apparatus;
means, mounted to the single trailer, for leveling a frame of the single trailer;
means, mounted to the single trailer, for elevating an end of the second conveyor to an operational angle;
means, mounted to the single trailer, for locking the second conveyor at its operational angle, wherein the first conveyor conveys sand from the input hopper to the second conveyor, wherein the second conveyor conveys sand received from the first conveyor to a higher elevation and drops the sand into the sand-liquid blender that mixes a liquid containing water with the sand to form a frac-sand slurry;
means, mounted to the single trailer, for sifting the frac-sand slurry to form sifted frac-sand slurry;

means, mounted to the single trailer, for funneling the sifted frac-sand slurry downward into a customer's hydraulic fracturing pumping equipment; and means, mounted to the single trailer, for swinging the means for funneling from its highway-travel configuration to its operational configuration.

22. A non-transitory computer-readable storage medium storing one or more programs configured to be executed by one or more processors of a self-contained trailer system that includes a single trailer suitable for highway travel, wherein on the trailer are mounted and pre-assembled: an input hopper, a first conveyor, a second conveyor, a sand-liquid blender, a vibratory sifter located below the sand-liquid blender, a discharge funnel that is positionable to a location below the vibratory sifter to receive sifted frac-sand slurry from the vibratory sifter, an electrical generator set for powering the system, and a plurality of elevation actuators and a plurality of height-maintenance locks, the one or more programs including instructions for:

elevating an end of the second conveyor to an operational angle using one or more of a plurality of elevation actuators;

locking the second conveyor at its operational angle using one or more of a plurality of height-maintenance locks;

swinging the discharge funnel from its highway-travel configuration to its operational configuration;

using the first conveyor to convey sand from the input hopper to the second conveyor;

using the second conveyor to convey its sand to a higher elevation and drop the sand into the sand-liquid blender;

using the sand-liquid blender to mix a liquid containing water with the sand to form a frac-sand slurry; and sifting the frac-sand slurry using the vibratory sifter to form sifted frac-sand slurry.

\* \* \* \* \*